United States Patent
Buiatti et al.

(10) Patent No.: US 8,982,588 B2
(45) Date of Patent: Mar. 17, 2015

(54) METHOD AND AN APPARATUS FOR CONTROLLING THE OUTPUT VOLTAGE OF A BOOST CONVERTER COMPOSED OF PLURAL BRIDGE DEVICES

(75) Inventors: Gustavo Buiatti, Rennes Cedex (FR); Tomoyuki Kawakami, Hyogo (JP); Tatsuya Okuda, Hyogo (JP); Nicolas Voyer, Rennes Cedex (FR)

(73) Assignee: Mitsubishi Electric Corporation, Tokyo (JP)

( * ) Notice: Subject to any disclaimer, the term of this patent is extended or adjusted under 35 U.S.C. 154(b) by 609 days.

(21) Appl. No.: 13/259,911

(22) PCT Filed: Apr. 22, 2010

(86) PCT No.: PCT/EP2010/055311
§ 371 (c)(1),
(2), (4) Date: Oct. 21, 2011

(87) PCT Pub. No.: WO2010/122083
PCT Pub. Date: Oct. 28, 2010

(65) Prior Publication Data
US 2012/0038330 A1     Feb. 16, 2012

(30) Foreign Application Priority Data
Apr. 23, 2009    (EP) .................................... 09158614

(51) Int. Cl.
*H02M 3/07*     (2006.01)
*H02M 3/158*     (2006.01)
(Continued)

(52) U.S. Cl.
CPC .............. *H02M 3/1582* (2013.01); *H02M 3/07* (2013.01); *H02M 2001/007* (2013.01); *H02M 2007/4835* (2013.01); *H02J 3/383* (2013.01); *Y02E 10/563* (2013.01)

USPC ................................. 363/60; 363/68; 323/271

(58) Field of Classification Search
CPC ... H02M 3/156; H02M 3/158; H02M 3/1584; H02M 3/07; G05F 1/10; G05F 1/46
USPC .......... 363/59, 60, 65, 68; 323/234, 268, 271, 323/282
See application file for complete search history.

(56) References Cited

U.S. PATENT DOCUMENTS 3,867,643 A    2/1975   Baker et al.
6,005,788 A    12/1999   Lipo et al.
(Continued)

OTHER PUBLICATIONS

U.S. Appl. No. 13/265,733, filed Oct. 21, 2011, Voyer.
(Continued)

*Primary Examiner* — Timothy J Dole
*Assistant Examiner* — Shahzeb K Ahmad
(74) *Attorney, Agent, or Firm* — Oblon, McClelland, Maier & Neustadt, L.L.P.

(57) ABSTRACT

A method and apparatus for controlling the output voltage of a boost converter including a number n of bridge devices connected in series, each bridge device including plural switches and a capacitor. The method and apparatus provide control of the switches according to a selected periodical matrix pattern including a number N of time intervals, N being a positive integer greater than 2, and in that in each time interval, the voltage between the input and the output of each ith bridge device with i from one to n, is equal to one of a null value, a number ki times a positive value, and minus the number ki times the positive value, the positive value being the result of the division of the output voltage of the boost converter including the n bridge devices by the number of time intervals N of the periodical matrix pattern.

14 Claims, 23 Drawing Sheets

(51) Int. Cl.
    *H02M 1/00*    (2006.01)
    *H02M 7/483*   (2007.01)
    *H02J 3/38*    (2006.01)

(56) References Cited

U.S. PATENT DOCUMENTS

| | | | |
|---|---|---|---|
| 6,198,645 B1 | 3/2001 | Kotowski et al. | |
| 6,469,569 B1* | 10/2002 | Miyamitsu | 327/536 |
| 7,907,429 B2* | 3/2011 | Ramadass et al. | 363/59 |
| 8,089,787 B2* | 1/2012 | Melse | 363/62 |
| 2010/0259955 A1* | 10/2010 | Shimada | 363/49 |
| 2012/0044726 A1* | 2/2012 | Voyer | 363/60 |

OTHER PUBLICATIONS

U.S. Appl. No 13/265,080, filed Oct. 18, 2011, Buiatti, et al.
U.S. Appl. No. 13/265,342, filed Oct. 20, 2011, Buiatti, et al.
Anonymous, "AS1302 5V/30mA Adaptive Inductorless Boost Converter", Austriamicrosystems, pp. 1-18, XP-002549288, (Jan. 12, 2009).
International Search Report Issued Sep. 27, 2010 in PCT/EP10/055311 filed Apr. 22, 2010.

* cited by examiner

| Vin | Vout | ratio | D | (N,P) | $V_{ref}$ | Fig |
|---|---|---|---|---|---|---|
| 30 | 240 | 8 | 0.875 | (8,7) | 30 | 5a |
| 34.3 | 240 | 7 | 0.857 | (7,6) | 34.28 | 6a |
| 40 | 240 | 6 | 0.833 | (6,5) | 40 | 8a |
| 48 | 240 | 5 | 0.8 | (5,4) | 48 | 9a |
| 60 | 240 | 4 | 0.75 | (8,6) | 30 | 5b |
| 68.6 | 240 | 3.5 | 0.714 | (7,5) | 34.28 | 6b |
| 72 | 240 | 3.33 | 0.7 | (10,7) | 24 | 7a |
| 90 | 240 | 2.66 | 0.625 | (8,5) | 30 | 5c, 5d |
| 96 | 240 | 2.5 | 0.6 | (5,3) | 48 | 9b |
| 103 | 240 | 2.33 | 0.571 | (7,4) | 34.28 | 6c |
| 120 | 240 | 2 | 0.5 | (8,4) | 30 | 5e |
| 137 | 240 | 1.75 | 0.428 | (7,3) | 34.28 | 6d |
| 144.6 | 240 | 1.66 | 0.4 | (5,2) | 48 | 9c |
| 150 | 240 | 1.6 | 0.375 | (8,3) | 30 | 5f |
| 169 | 240 | 1.42 | 0.3 | (10,3) | 24 | 7b |
| 171.4 | 240 | 1.4 | 0.285 | (7,2) | 34.28 | 6e |
| 180 | 240 | 1.33 | 0.25 | (8,2) | 30 | 5g |
| 192 | 240 | 1.25 | 0.2 | (5,1) | 48 | 9d |
| 200 | 240 | 1.2 | 0.166 | (6,1) | 40 | 8b, 8c |
| 205.7 | 240 | 1.16 | 0.142 | (7,1) | 34.28 | 6f |
| 210 | 240 | 1.14 | 0.125 | (8,1) | 30 | 5h |

| | 350 | 351 | 352 | 353 | 354 | 355 | 356 | |
|---|---|---|---|---|---|---|---|---|
| | Vin | Vout | ratio | D | (N,P) | $V_{ref}$ | Fig | |
| | 100 | 800 | 8 | 0.875 | (8,7) | 100 | 12a | 360 |
| | 114.3 | 800 | 7 | 0.857 | (7,6) | 114.3 | 13a | 361 |
| | 133.3 | 800 | 6 | 0.833 | (6,5) | 133.3 | 14b | 362 |
| | 177.7 | 800 | 4.5 | 0.778 | (9,7) | 88.9 | 11a | 363 |
| | 200 | 800 | 4 | 0.75 | (8,6) | 100 | 12b | 364 |
| | 228.6 | 800 | 3.5 | 0.714 | (7,5) | 114.3 | 13b | 365 |
| | 240 | 800 | 3.33 | 0.7 | (10,7) | 80 | 10a | 366 |
| | 266.7 | 800 | 3 | 0.667 | (9,6) | 88.9 | 11b | 367 |
| | 300 | 800 | 2.67 | 0.625 | (8,5) | 100 | 12c | 368 |
| | 342.9 | 800 | 2.33 | 0.571 | (7,4) | 114.3 | 13c | 369 |
| | 400 | 800 | 2 | 0.5 | (8,4) | 100 | 12d | 370 |
| | 457.1 | 800 | 1.75 | 0.429 | (7,3) | 114.3 | 13d | 371 |
| | 500 | 800 | 1.6 | 0.375 | (8,3) | 100 | 12e | 372 |
| | 533.3 | 800 | 1.5 | 0.333 | (9,3) | 88.9 | 11c | 373 |
| | 560 | 800 | 1.42 | 0.3 | (10,3) | 80 | 10b | 374 |
| | 571.4 | 800 | 1.4 | 0.285 | (7,2) | 114.3 | 13e | 375 |
| | 600 | 800 | 1.33 | 0.25 | (8,2) | 100 | 12f | 376 |
| | 622.2 | 800 | 1.29 | 0.222 | (9,2) | 88.9 | 11d | 377 |
| | 666.6 | 800 | 1.2 | 0.167 | (6,1) | 133.3 | 14a | 378 |
| | 685.7 | 800 | 1.17 | 0.143 | (7,1) | 114.3 | 13f | 379 |
| | 700 | 800 | 1.14 | 0.125 | (8,1) | 100 | 12g | 380 |

Fig. 3b

| B1 | | | B2 | | | B3 | | | B4 | | |
|---|---|---|---|---|---|---|---|---|---|---|---|
| Vb1 | S11 | S12 | Vb2 | S21 | S22 | Vb3 | S31 | S32 | Vb4 | S41 | S42 |
| Vc1 | OFF | OFF | Vc2 | OFF | OFF | Vc3 | OFF | OFF | Vc4 | OFF | OFF |
| 0 | OFF | ON | 0 | OFF | ON | 0 | OFF | ON | 0 | OFF/ON | ON/OFF |
| -Vc1 | ON | ON | -Vc2 | ON | ON | -Vc3 | ON | ON | -Vc4 | ON | ON |

| B1 | | | B2 | | | B3 | | | B4 | | |
|---|---|---|---|---|---|---|---|---|---|---|---|
| Vb1 | S11 | S12 | Vb2 | S21 | S22 | Vb3 | S31 | S32 | Vb4 | S41 | S42' |
| Vc1 | OFF | OFF | Vc2 | OFF | OFF | Vc3 | OFF | OFF | Vc4 | OFF | ON |
| 0 | OFF | ON | 0 | OFF | ON | 0 | OFF | ON | 0 | ON/OFF | ON/OFF |
| -Vc1 | ON | ON | -Vc2 | ON | ON | -Vc3 | ON | ON | -Vc4 | ON | OFF |

| P=7 N=8 D=0.875 $V_{ref}$ = Vout/8 | Time interval | | | | | | | |
|---|---|---|---|---|---|---|---|---|
| | T1 | T2 | T3 | T4 | T5 | T6 | T7 | T8 |
| Vc1= $V_{ref}$ | 1 | 1 | 1 | 1 | -1 | -1 | -1 | -1 |
| Vc2=2$V_{ref}$ | 0 | 0 | 0 | 0 | 1 | 1 | -1 | -1 |
| Vc3= 4$V_{ref}$ | 0 | 0 | 0 | 0 | 0 | 0 | 1 | -1 |

| P=6 N=8 D=0.75 $V_{ref}$ = Vout/8 | Time interval | | | | | | | |
|---|---|---|---|---|---|---|---|---|
| | T1 | T2 | T3 | T4 | T5 | T6 | T7 | T8 |
| Vc1= $V_{ref}$ | 0 | 0 | 0 | 0 | 0 | 0 | 0 | 0 |
| Vc2=2$V_{ref}$ | 1 | 1 | 1 | 1 | -1 | -1 | -1 | -1 |
| Vc3= 4$V_{ref}$ | 0 | 0 | 0 | 0 | 1 | 1 | -1 | -1 |

| P=5 N=8 D=0.625 Vref = Vout/8 | Time interval | | | | | | | |
|---|---|---|---|---|---|---|---|---|
| | T1 | T2 | T3 | T4 | T5 | T6 | T7 | T8 |
| Vc1= Vref | -1 | 1 | 1 | 1 | 1 | -1 | -1 | -1 |
| Vc2=2Vref | 0 | -1 | -1 | 1 | 1 | 0 | 0 | 0 |
| Vc3= 4Vref | 1 | 1 | 1 | 0 | 0 | -1 | -1 | -1 |

Fig. 5c

| P=5 N=8 D=0.625 $V_{ref}$ = Vout/8 | Time interval | | | | | | | |
|---|---|---|---|---|---|---|---|---|
| | T1 | T2 | T3 | T4 | T5 | T6 | T7 | T8 |
| Vc1= $V_{ref}$ | 1 | 1 | -1 | -1 | -1 | -1 | 1 | 1 |
| Vc2=2$V_{ref}$ | 1 | 1 | 0 | 0 | 0 | 0 | -1 | -1 |
| Vc3= 4$V_{ref}$ | 0 | 0 | 1 | 1 | 1 | -1 | -1 | -1 |

Fig. 5d

| P=4 N=8 D=0.5 $V_{ref}$= Vout/8 | Time interval | | | | | | | |
|---|---|---|---|---|---|---|---|---|
| | T1 | T2 | T3 | T4 | T5 | T6 | T7 | T8 |
| Vc1= $V_{ref}$ | 0 | 0 | 0 | 0 | 0 | 0 | 0 | 0 |
| Vc2=2$V_{ref}$ | 0 | 0 | 0 | 0 | 0 | 0 | 0 | 0 |
| Vc3= 4$V_{ref}$ | 1 | 1 | 1 | 1 | -1 | -1 | -1 | -1 |

Fig. 5e

| P=3 N=8 D=0.375 $V_{ref}$ = Vout/8 | Time interval | | | | | | | |
|---|---|---|---|---|---|---|---|---|
| | T1 | T2 | T3 | T4 | T5 | T6 | T7 | T8 |
| Vc1= $V_{ref}$ | 1 | -1 | -1 | -1 | -1 | 1 | 1 | 1 |
| Vc2=2$V_{ref}$ | 0 | 1 | 1 | -1 | -1 | 0 | 0 | 0 |
| Vc3= 4$V_{ref}$ | 1 | 1 | 1 | 0 | 0 | -1 | -1 | -1 |

| P=2 N=8 D=0.25 $V_{ref}$ = Vout/8 | Time interval | | | | | | | |
|---|---|---|---|---|---|---|---|---|
| | T1 | T2 | T3 | T4 | T5 | T6 | T7 | T8 |
| Vc1= $V_{ref}$ | 0 | 0 | 0 | 0 | 0 | 0 | 0 | 0 |
| Vc2=2$V_{ref}$ | 1 | 1 | -1 | -1 | -1 | -1 | 1 | 1 |
| Vc3= 4$V_{ref}$ | 1 | 1 | 0 | 0 | 0 | 0 | -1 | -1 |

| P=1 N=8 D=0.125 $V_{ref}$ = Vout/8 | Time interval | | | | | | | |
|---|---|---|---|---|---|---|---|---|
| | T1 | T2 | T3 | T4 | T5 | T6 | T7 | T8 |
| Vc1= $V_{ref}$ | 1 | -1 | -1 | -1 | -1 | 1 | 1 | 1 |
| Vc2=2$V_{ref}$ | 1 | 0 | 0 | 0 | 0 | -1 | -1 | 1 |
| Vc3= 4$V_{ref}$ | 1 | 0 | 0 | 0 | 0 | 0 | 0 | -1 |

| P=6 N=7<br>D=0.858<br>Vref = Vout/7 | Time interval | | | | | | |
|---|---|---|---|---|---|---|---|
| | T1 | T2 | T3 | T4 | T5 | T6 | T7 |
| Vc1= Vref | 1 | 1 | 1 | -1 | -1 | -1 | 0 |
| Vc2=2Vref | 0 | 0 | 0 | 1 | 1 | -1 | -1 |
| Vc3= 4Vref | 0 | 0 | 0 | 0 | 0 | 1 | -1 |

Fig. 6a

| P=5 N=7<br>D=0.714<br>Vref = Vout/7 | Time interval | | | | | | |
|---|---|---|---|---|---|---|---|
| | T1 | T2 | T3 | T4 | T5 | T6 | T7 |
| Vc1= $V_{ref}$ | 0 | 0 | 0 | 0 | 0 | 1 | -1 |
| Vc2=2$V_{ref}$ | 1 | 1 | 1 | -1 | -1 | -1 | 0 |
| Vc3= 4$V_{ref}$ | 0 | 0 | 0 | 1 | 1 | -1 | -1 |

Fig. 6b

| P=4 N=7<br>D=0.571<br>$V_{ref}$ = Vout/7 | Time interval | | | | | | |
|---|---|---|---|---|---|---|---|
| | T1 | T2 | T3 | T4 | T5 | T6 | T7 |
| Vc1= $V_{ref}$ | -1 | -1 | 1 | 1 | 0 | 0 | 0 |
| Vc2=2$V_{ref}$ | 0 | 0 | -1 | 1 | 0 | 0 | 0 |
| Vc3= 4$V_{ref}$ | 1 | 1 | 1 | 0 | -1 | -1 | -1 |

Fig. 6c

| P=3 N=7 D=0.428 $V_{ref}$ = Vout/7 | Time interval | | | | | | |
|---|---|---|---|---|---|---|---|
| | T1 | T2 | T3 | T4 | T5 | T6 | T7 |
| Vc1= $V_{ref}$ | 0 | 0 | 0 | 1 | 1 | -1 | -1 |
| Vc2=2$V_{ref}$ | 0 | 0 | 0 | 0 | 0 | -1 | 1 |
| Vc3= 4$V_{ref}$ | 1 | 1 | 1 | -1 | -1 | 0 | -1 |

Fig. 6d

| P=2 N=7 D=0.285 $V_{ref}$ = Vout/7 | Time interval | | | | | | |
|---|---|---|---|---|---|---|---|
| | T1 | T2 | T3 | T4 | T5 | T6 | T7 |
| Vc1= $V_{ref}$ | 1 | -1 | 0 | 0 | 0 | 0 | 0 |
| Vc2=2$V_{ref}$ | 0 | 1 | 1 | 1 | -1 | -1 | -1 |
| Vc3= 4$V_{ref}$ | 1 | 1 | -1 | -1 | 0 | 0 | 0 |

Fig. 6e

| P=1 N=7 D=0.142 $V_{ref}$ = Vout/7 | Time interval | | | | | | |
|---|---|---|---|---|---|---|---|
| | T1 | T2 | T3 | T4 | T5 | T6 | T7 |
| Vc1= $V_{ref}$ | 0 | -1 | -1 | -1 | 1 | 1 | 1 |
| Vc2=2$V_{ref}$ | 1 | 0 | 0 | 0 | -1 | -1 | 1 |
| Vc3= 4$V_{ref}$ | 1 | 0 | 0 | 0 | 0 | 0 | -1 |

Fig. 6f

| P=7 N=10 D=0.7 $V_{ref}$ = Vout/10 | Time interval | | | | | | | | | |
|---|---|---|---|---|---|---|---|---|---|---|
| | T1 | T2 | T3 | T4 | T5 | T6 | T7 | T8 | T9 | T10 |
| Vc1= $V_{ref}$ | 1 | 1 | 1 | 1 | 1 | -1 | -1 | -1 | -1 | -1 |
| Vc2=2$V_{ref}$ | 1 | 1 | 1 | 1 | -1 | 0 | 0 | -1 | -1 | -1 |
| Vc3= 4$V_{ref}$ | 0 | 0 | 0 | 0 | 1 | 1 | 1 | -1 | -1 | -1 |

Fig. 7a

| P=3 N=10 D=0.3 $V_{ref}$ = Vout/10 | Time interval | | | | | | | | | |
|---|---|---|---|---|---|---|---|---|---|---|
| | T1 | T2 | T3 | T4 | T5 | T6 | T7 | T8 | T9 | T10 |
| Vc1= $V_{ref}$ | 1 | 1 | 1 | -1 | -1 | -1 | -1 | -1 | 1 | 1 |
| Vc2=2$V_{ref}$ | 1 | 1 | 1 | -1 | -1 | -1 | -1 | 1 | 0 | 0 |
| Vc3= 4$V_{ref}$ | 1 | 1 | 1 | 0 | 0 | 0 | 0 | -1 | -1 | -1 |

Fig. 7b

| P=5 N=6 D=0.833 $V_{ref}$ = Vout/6 | Time interval | | | | | |
|---|---|---|---|---|---|---|
| | T1 | T2 | T3 | T4 | T5 | T6 |
| Vc1= $V_{ref}$ | 1 | 1 | 1 | -1 | -1 | -1 |
| Vc2=2$V_{ref}$ | 0 | 0 | 0 | 1 | -1 | 0 |
| Vc3= 4$V_{ref}$ | 0 | 0 | 0 | 0 | 1 | -1 |

Fig. 8a

| P=1 N=6 D=0.166 $V_{ref}$ = Vout/6 | Time interval | | | | | |
|---|---|---|---|---|---|---|
| | T1 | T2 | T3 | T4 | T5 | T6 |
| Vc1= $V_{ref}$ | 1 | 1 | 1 | -1 | -1 | -1 |
| Vc2=2$V_{ref}$ | 0 | 1 | -1 | 0 | 0 | 0 |
| Vc3= 4$V_{ref}$ | 1 | -1 | 0 | 0 | 0 | 0 |

Fig. 8b

| P=1 N=6 D=0.166 $V_{ref}$ = Vout/6 | Time interval | | | | | |
| --- | --- | --- | --- | --- | --- | --- |
| | T1 | T2 | T3 | T4 | T5 | T6 |
| Vc1= $V_{ref}$ | -1 | 1 | 1 | 1 | -1 | -1 |
| Vc2=2$V_{ref}$ | 1 | 1 | -1 | -1 | 0 | 0 |
| Vc3= 4$V_{ref}$ | 1 | -1 | 0 | 0 | 0 | 0 |

Fig. 8c

| P=4 N=5 D=0.8 $V_{ref}$ = Vout/5 | Time interval | | | | |
| --- | --- | --- | --- | --- | --- |
| | T1 | T2 | T3 | T4 | T5 |
| Vc1= $V_{ref}$ | -1 | -1 | 1 | 1 | 0 |
| Vc2=2$V_{ref}$ | -1 | 1 | 0 | 0 | 0 |
| Vc3= 4$V_{ref}$ | 1 | 0 | 0 | 0 | -1 |

Fig. 9a

| P=3 N=5 D=0.6 $V_{ref}$ = Vout/5 | Time interval | | | | |
| --- | --- | --- | --- | --- | --- |
| | T1 | T2 | T3 | T4 | T5 |
| Vc1= $V_{ref}$ | 0 | 0 | 0 | -1 | 1 |
| Vc2=2$V_{ref}$ | -1 | 1 | 1 | -1 | 0 |
| Vc3= 4$V_{ref}$ | 1 | 0 | 0 | 0 | -1 |

Fig. 9b

| P=2 N=5<br>D=0.4<br>$V_{ref}$ = Vout/5 | Time interval | | | | |
| --- | --- | --- | --- | --- | --- |
| | T1 | T2 | T3 | T4 | T5 |
| $Vc1 = V_{ref}$ | 1 | -1 | 0 | 0 | 0 |
| $Vc2 = 2V_{ref}$ | 1 | 0 | 1 | -1 | -1 |
| $Vc3 = 4V_{ref}$ | 0 | 1 | -1 | 0 | 0 |

| P=1 N=5<br>D=0.2<br>$V_{ref}$ = Vout/5 | Time interval | | | | |
| --- | --- | --- | --- | --- | --- |
| | T1 | T2 | T3 | T4 | T5 |
| $Vc1 = V_{ref}$ | 0 | 1 | 1 | -1 | -1 |
| $Vc2 = 2V_{ref}$ | 0 | 1 | -1 | 0 | 0 |
| $Vc3 = 4V_{ref}$ | 1 | -1 | 0 | 0 | 0 |

| P=7 N=10 D=0.7 $V_{ref}$ = Vout/10 | Time interval | | | | | | | | | |
|---|---|---|---|---|---|---|---|---|---|---|
| | T1 | T2 | T3 | T4 | T5 | T6 | T7 | T8 | T9 | T10 |
| Vc1= $V_{ref}$ | 1 | 1 | 1 | 1 | -1 | 0 | 0 | -1 | -1 | -1 |
| Vc2=$V_{ref}$ | 1 | 1 | 1 | 1 | 0 | -1 | 0 | -1 | -1 | -1 |
| Vc3= $V_{ref}$ | 1 | 1 | 1 | 1 | 0 | 0 | -1 | -1 | -1 | -1 |
| Vc4= 4$V_{ref}$ | 0 | 0 | 0 | 0 | 1 | 1 | 1 | -1 | -1 | -1 |

Fig. 10a

| P=3 N=10 D=0.3 $V_{ref}$ = Vout/10 | Time interval | | | | | | | | | |
|---|---|---|---|---|---|---|---|---|---|---|
| | T1 | T2 | T3 | T4 | T5 | T6 | T7 | T8 | T9 | T10 |
| Vc1= $V_{ref}$ | 1 | 1 | 1 | 0 | 0 | 1 | -1 | -1 | -1 | -1 |
| Vc2=$V_{ref}$ | 1 | 1 | 1 | 0 | 1 | 0 | -1 | -1 | -1 | -1 |
| Vc3= $V_{ref}$ | 1 | 1 | 1 | 1 | 0 | 0 | -1 | -1 | -1 | -1 |
| Vc4= 4$V_{ref}$ | 1 | 1 | 1 | -1 | -1 | -1 | 0 | 0 | 0 | 0 |

Fig. 10b

| P=7 N=9 D=0.777 $V_{ref}$ = Vout/9 | Time interval | | | | | | | | |
|---|---|---|---|---|---|---|---|---|---|
| | T1 | T2 | T3 | T4 | T5 | T6 | T7 | T8 | T9 |
| Vc1= $V_{ref}$ | 1 | 1 | 1 | 1 | 0 | -1 | -1 | -1 | -1 |
| Vc2=$V_{ref}$ | 1 | 1 | 1 | 0 | 1 | -1 | -1 | -1 | -1 |
| Vc3= $V_{ref}$ | 0 | 0 | 0 | 1 | 1 | 0 | 0 | -1 | -1 |
| Vc4= 4$V_{ref}$ | 0 | 0 | 0 | 0 | 0 | 1 | 1 | -1 | -1 |

Fig. 11a

| P=6 N=9 D=0.666 $V_{ref}$ = Vout/9 | Time interval | | | | | | | | | |
|---|---|---|---|---|---|---|---|---|---|---|
| | T1 | T2 | T3 | T4 | T5 | T6 | T7 | T8 | T9 | |
| Vc1= $V_{ref}$ | 1 | 1 | 1 | 1 | -1 | -1 | -1 | -1 | 0 | 1111 |
| Vc2=$V_{ref}$ | 1 | 1 | 1 | -1 | 1 | -1 | -1 | 0 | -1 | 1112 |
| Vc3= $V_{ref}$ | 1 | 1 | 1 | -1 | -1 | 1 | 0 | -1 | -1 | 1113 |
| Vc4= 4$V_{ref}$ | 0 | 0 | 0 | 1 | 1 | 1 | -1 | -1 | -1 | 1114 |

Fig. 11b

| P=3 N=9 D=0.333 $V_{ref}$ = Vout/9 | Time interval | | | | | | | | | |
|---|---|---|---|---|---|---|---|---|---|---|
| | T1 | T2 | T3 | T4 | T5 | T6 | T7 | T8 | T9 | |
| Vc1= $V_{ref}$ | 0 | 1 | 1 | -1 | 1 | 1 | -1 | -1 | -1 | 1121 |
| Vc2=$V_{ref}$ | 1 | 0 | 1 | 1 | -1 | 1 | -1 | -1 | -1 | 1122 |
| Vc3= $V_{ref}$ | 1 | 1 | 0 | 1 | 1 | -1 | -1 | -1 | -1 | 1123 |
| Vc4= 4$V_{ref}$ | 1 | 1 | 1 | -1 | -1 | -1 | 0 | 0 | 0 | 1124 |

Fig. 11c

| P=2 N=9 D=0.222 $V_{ref}$ = Vout/9 | Time interval | | | | | | | | | |
|---|---|---|---|---|---|---|---|---|---|---|
| | T1 | T2 | T3 | T4 | T5 | T6 | T7 | T8 | T9 | |
| Vc1= $V_{ref}$ | 1 | 1 | 1 | 1 | 0 | -1 | -1 | -1 | -1 | 1131 |
| Vc2=$V_{ref}$ | 1 | 1 | 1 | 1 | -1 | 0 | -1 | -1 | -1 | 1132 |
| Vc3= $V_{ref}$ | 1 | 1 | 0 | 0 | -1 | -1 | 0 | 0 | 0 | 1133 |
| Vc4= 4$V_{ref}$ | 1 | 1 | -1 | -1 | 0 | 0 | 0 | 0 | 0 | 1134 |

Fig. 11d

| P=7 N=8 D=0.875 $V_{ref}$ = Vout/8 | Time interval | | | | | | | |
|---|---|---|---|---|---|---|---|---|
| | T1 | T2 | T3 | T4 | T5 | T6 | T7 | T8 |
| Vc1= $V_{ref}$ | 1 | 1 | 1 | 0 | 0 | -1 | -1 | -1 |
| Vc2= $V_{ref}$ | 1 | 0 | -1 | 1 | 0 | 1 | -1 | -1 |
| Vc3= $V_{ref}$ | -1 | 0 | 1 | 0 | 1 | 1 | -1 | -1 |
| Vc4= $4V_{ref}$ | 0 | 0 | 0 | 0 | 0 | 0 | 1 | -1 |

Fig. 12a

| P=6 N=8 D=0.75 $V_{ref}$ = Vout/8 | Time interval | | | | | | | |
|---|---|---|---|---|---|---|---|---|
| | T1 | T2 | T3 | T4 | T5 | T6 | T7 | T8 |
| Vc1= $V_{ref}$ | 1 | 1 | 0 | 0 | 1 | -1 | -1 | -1 |
| Vc2= $V_{ref}$ | 1 | 0 | 1 | -1 | 1 | -1 | 0 | -1 |
| Vc3= $V_{ref}$ | 0 | 1 | 1 | -1 | 0 | 0 | -1 | 0 |
| Vc4= $4V_{ref}$ | 0 | 0 | 0 | 1 | 0 | 1 | -1 | -1 |

Fig. 12b

| P=5 N=8 D=0.625 $V_{ref}$ = Vout/8 | Time interval | | | | | | | |
|---|---|---|---|---|---|---|---|---|
| | T1 | T2 | T3 | T4 | T5 | T6 | T7 | T8 |
| Vc1= $V_{ref}$ | 1 | 1 | -1 | 1 | -1 | 0 | 0 | -1 |
| Vc2= $V_{ref}$ | 1 | 1 | 1 | -1 | -1 | 0 | -1 | 0 |
| Vc3= $V_{ref}$ | 1 | 1 | -1 | -1 | 1 | -1 | 0 | 0 |
| Vc4= $4V_{ref}$ | 0 | 0 | 1 | 1 | 1 | -1 | -1 | -1 |

Fig. 12c

| P=4 N=8<br>D=0.5<br>$V_{ref}$ = Vout/8 | Time interval | | | | | | | | |
|---|---|---|---|---|---|---|---|---|---|
| | T1 | T2 | T3 | T4 | T5 | T6 | T7 | T8 | |
| Vc1= $V_{ref}$ | 0 | 0 | 0 | 0 | 0 | 0 | 0 | 0 | ⌐731 |
| Vc2=$V_{ref}$ | 0 | 0 | 0 | 0 | 0 | 0 | 0 | 0 | ⌐732 |
| Vc3= $V_{ref}$ | 0 | 0 | 0 | 0 | 0 | 0 | 0 | 0 | ⌐733 |
| Vc4= 4$V_{ref}$ | 1 | 1 | 1 | 1 | -1 | -1 | -1 | -1 | ⌐734 |

Fig. 12d

| P=3 N=8<br>D=0.375<br>$V_{ref}$ = Vout/8 | Time interval | | | | | | | | |
|---|---|---|---|---|---|---|---|---|---|
| | T1 | T2 | T3 | T4 | T5 | T6 | T7 | T8 | |
| Vc1= $V_{ref}$ | 1 | 0 | 0 | 1 | -1 | 1 | -1 | -1 | ⌐741 |
| Vc2=$V_{ref}$ | 0 | 1 | 0 | 1 | 1 | -1 | -1 | -1 | ⌐742 |
| Vc3= $V_{ref}$ | 0 | 0 | 1 | -1 | 1 | 1 | -1 | -1 | ⌐743 |
| Vc4= 4$V_{ref}$ | 1 | 1 | 1 | -1 | -1 | -1 | 0 | 0 | ⌐744 |

Fig. 12e

| P=2 N=8<br>D=0.25<br>$V_{ref}$ = Vout/8 | Time interval | | | | | | | | |
|---|---|---|---|---|---|---|---|---|---|
| | T1 | T2 | T3 | T4 | T5 | T6 | T7 | T8 | |
| Vc1= $V_{ref}$ | 1 | 1 | 1 | -1 | 0 | 0 | -1 | -1 | ⌐751 |
| Vc2=$V_{ref}$ | 1 | 0 | 1 | -1 | 1 | -1 | 0 | -1 | ⌐752 |
| Vc3= $V_{ref}$ | 0 | 1 | 0 | 0 | 1 | -1 | -1 | 0 | ⌐753 |
| Vc4= 4$V_{ref}$ | 1 | 1 | -1 | 0 | -1 | 0 | 0 | 0 | ⌐754 |

Fig. 12f

| P=1 N=8 D=0.125 $V_{ref}$ = Vout/8 | Time interval | | | | | | | | |
|---|---|---|---|---|---|---|---|---|---|
| | T1 | T2 | T3 | T4 | T5 | T6 | T7 | T8 | |
| Vc1= $V_{ref}$ | 1 | 1 | 1 | 0 | 0 | -1 | -1 | -1 | 1261 |
| Vc2=$V_{ref}$ | 1 | 1 | -1 | 0 | -1 | 1 | 0 | -1 | 1262 |
| Vc3= $V_{ref}$ | 1 | 1 | -1 | -1 | 0 | -1 | 0 | 1 | 1263 |
| Vc4= $4V_{ref}$ | 1 | -1 | 0 | 0 | 0 | 0 | 0 | 0 | 1264 |

Fig. 12g

| P=6 N=7 D=0.858 $V_{ref}$ = Vout/7 | Time interval | | | | | | | |
|---|---|---|---|---|---|---|---|---|
| | T1 | T2 | T3 | T4 | T5 | T6 | T7 | |
| Vc1= $V_{ref}$ | 1 | 1 | 1 | 0 | -1 | -1 | -1 | 1301 |
| Vc2=$V_{ref}$ | 0 | 1 | 0 | 0 | 1 | -1 | -1 | 1302 |
| Vc3= $V_{ref}$ | 0 | -1 | 0 | 1 | 1 | -1 | 0 | 1303 |
| Vc4= $4V_{ref}$ | 0 | 0 | 0 | 0 | 0 | 1 | -1 | 1304 |

Fig. 13a

| P=5 N=7 D=0.714 $V_{ref}$ = Vout/7 | | | | | | | | |
|---|---|---|---|---|---|---|---|---|
| | T1 | T2 | T3 | T4 | T5 | T6 | T7 | |
| Vc1= $V_{ref}$ | -1 | -1 | 1 | 1 | 1 | 0 | -1 | 1311 |
| Vc2=$V_{ref}$ | -1 | 0 | 1 | 1 | 0 | -1 | 0 | 1312 |
| Vc3= $V_{ref}$ | 0 | -1 | 0 | 0 | 1 | 0 | 0 | 1313 |
| Vc4= $4V_{ref}$ | 1 | 1 | 0 | 0 | 0 | -1 | -1 | 1314 |

Fig. 13b

| P=4 N=7<br>D=0.571<br>$V_{ref}$ = Vout/7 | T1 | T2 | T3 | T4 | T5 | T6 | T7 | |
|---|---|---|---|---|---|---|---|---|
| Vc1= $V_{ref}$ | -1 | -1 | 1 | 1 | 0 | 0 | 0 | 1321 |
| Vc2=$V_{ref}$ | -1 | -1 | 1 | -1 | 0 | 1 | 1 | 1322 |
| Vc3= $V_{ref}$ | 1 | 1 | 1 | -1 | 0 | -1 | -1 | 1323 |
| Vc4= 4$V_{ref}$ | 1 | 1 | 0 | 1 | -1 | -1 | -1 | 1324 |

Fig. 13c

| P=3 N=7<br>D=0.428<br>$V_{ref}$ = Vout/7 | T1 | T2 | T3 | T4 | T5 | T6 | T7 | |
|---|---|---|---|---|---|---|---|---|
| Vc1= $V_{ref}$ | 0 | 0 | 0 | -1 | -1 | 1 | 1 | 1331 |
| Vc2=$V_{ref}$ | -1 | -1 | 0 | 1 | -1 | 1 | 1 | 1332 |
| Vc3= $V_{ref}$ | 1 | 1 | 0 | 1 | -1 | -1 | -1 | 1333 |
| Vc4= 4$V_{ref}$ | 1 | 1 | 1 | -1 | 0 | -1 | -1 | 1334 |

Fig. 13d

| P=2 N=7<br>D=0.285<br>$V_{ref}$ = Vout/7 | T1 | T2 | T3 | T4 | T5 | T6 | T7 | |
|---|---|---|---|---|---|---|---|---|
| Vc1= $V_{ref}$ | 1 | 0 | -1 | -1 | -1 | 1 | 1 | 1341 |
| Vc2=$V_{ref}$ | 0 | 1 | 0 | -1 | -1 | 0 | 1 | 1342 |
| Vc3= $V_{ref}$ | 0 | 0 | -1 | 0 | 0 | 1 | 0 | 1343 |
| Vc4= 4$V_{ref}$ | 1 | 1 | 0 | 0 | 0 | -1 | -1 | 1344 |

Fig. 13e

| P=1 N=7 D=0.142 $V_{ref}$ = Vout/7 | T1 | T2 | T3 | T4 | T5 | T6 | T7 |
|---|---|---|---|---|---|---|---|
| Vc1= $V_{ref}$ | 1 | 1 | 1 | 0 | -1 | -1 | -1 | ⟵1351
| Vc2= $V_{ref}$ | 1 | 1 | -1 | 0 | -1 | 0 | 0 | ⟵1352
| Vc3= $V_{ref}$ | 0 | 1 | -1 | -1 | 1 | 0 | 0 | ⟵1353
| Vc4= 4$V_{ref}$ | 1 | -1 | 0 | 0 | 0 | 0 | 0 | ⟵1354

Fig. 13f

| P=1 N=6 D=0.167 $V_{ref}$ = Vout/6 | T1 | T2 | T3 | T4 | T5 | T6 |
|---|---|---|---|---|---|---|
| Vc1= $V_{ref}$ | 1 | 1 | 1 | -1 | -1 | -1 | ⟵1401
| Vc2= $V_{ref}$ | 1 | 1 | -1 | -1 | 0 | 0 | ⟵1402
| Vc3= $V_{ref}$ | -1 | 1 | -1 | 1 | 0 | 0 | ⟵1403
| Vc4= 4$V_{ref}$ | 1 | -1 | 0 | 0 | 0 | 0 | ⟵1404

Fig. 14a

| P=5 N=6 D=0.833 $V_{ref}$ = Vout/6 | T1 | T2 | T3 | T4 | T5 | T6 |
|---|---|---|---|---|---|---|
| Vc1= $V_{ref}$ | -1 | -1 | 1 | 1 | 1 | -1 | ⟵1411
| Vc2= $V_{ref}$ | -1 | 1 | 1 | 0 | 0 | -1 | ⟵1412
| Vc3= $V_{ref}$ | -1 | 1 | -1 | 0 | 0 | 1 | ⟵1413
| Vc4= 4$V_{ref}$ | 1 | 0 | 0 | 0 | 0 | -1 | ⟵1414

Fig. 14b

METHOD AND AN APPARATUS FOR CONTROLLING THE OUTPUT VOLTAGE OF A BOOST CONVERTER COMPOSED OF PLURAL BRIDGE DEVICES

The present invention relates generally to a method and an apparatus for controlling the output voltage of a boost converter composed of plural bridge devices.

Classical DC/DC converters use inductors in order to convert a direct current from a first voltage to a second voltage which may be larger or smaller than the first voltage.

Inductors are used for storing energy in the form of magnetic field (current) and they have many drawbacks. Inductors are heavy, their cost is relatively important because they are mainly composed of copper material.

The combination of switches and capacitors in order to replace inductors has been already proposed.

For example, charge pumps, also known as DC/DC converters or boost converters composed of plural bridge devices use capacitors as energy storage elements. When compared to inductive switching DC/DC converters, which also use inductors as energy storage elements, charge pumps offer unique characteristics that make them attractive for certain end-user applications.

Boost converters when operating in Continuous Current Mode (CCM) increase the voltage of the input by a ratio $r = V_{out}/V_{in} = 1/(1-D)$, where D is the duty cycle (between 0 and 1) of the main switch of the boost converter.

The main difference between conventional Boost converters and boost converters composed of plural bridge devices relies on the fact that the latter can only achieve some discrete values of voltage step-up ratio.

For example, in photovoltaic applications, large input voltage variations can be unacceptable for boost converters composed of plural bridge devices as the power provided by the solar module can not be maintained to the maximum power value corresponding to an optimum input voltage level.

The present invention aims to provide a boost converter composed of plural bridge devices which can work with an important number of voltage step-up ratios.

To that end, the present invention concerns a method for controlling the output voltage of a boost converter composed of a number n of bridge devices connected in series, each bridge device being composed of plural switches and a capacitor, characterised in that the method comprises the step of controlling the switches according to a periodical pattern decomposed in a number N of time intervals and in that in each time interval, the voltage between the input and the output of each $i^{th}$ bridge device with i from one to n, is equal to a null value, or a number $k_i$ times a positive value, or minus the number $k_i$ times the positive value, and in that the positive value is the result of the division of the output voltage of the boost converter composed of n bridge devices by the number of time intervals of the periodical pattern.

The present invention concerns also an apparatus for controlling the output voltage of a boost converter composed of a number n of bridge devices connected in series, each bridge device being composed of plural switches and a capacitor, characterised in that the apparatus comprises means for controlling the switches according to one periodical pattern being decomposed in a number N of time intervals and in that in each time interval, the voltage between the input and the output of each ith bridge device with i from one to n, is equal to a null value, or a number $k_i$ times a positive value, or minus the number $k_i$ times the positive value, the positive value being the result of the division of the output voltage of the boost converter composed of n bridge devices by the number of time intervals of the periodical pattern.

Thus, the boost converter composed of n bridge devices can work with an important number of voltage step-up ratios.

Furthermore, as the positive value is the result of the division of the expected value of the output voltage by the number of time intervals of the selected pattern the positive value can easily be determined from the expected output voltage level. One can then easily select the appropriate input voltage level from the positive value.

According to a particular feature, a matrix $V_{ij}$ of voltages between the input and the output of the $i^{th}$ bridge device during the $j^{th}$ time interval of the periodical pattern is of rank rk, rk being the number of bridge devices having a least one non null voltage value during the periodical pattern.

Thus, the voltage of bridge device capacitors converges to unique solution, and is stable even if small uncertainties may occur in setting the duration of time intervals.

According to a particular feature, the sum of the voltages between the input and the output of a bridge device over the number of time intervals of one periodical pattern equals a null value.

Thus, over one periodical pattern, the current delivered by a constant current source, such as a photovoltaic module, equally charges and discharges the capacitors of the bridge devices, and the voltage of capacitors is stable and does not discharge assuming a constant current source.

According to a particular feature, a first bridge device is connected to one of the terminals of an electric power source boosted by the boost converter composed of n bridge devices and one of the switches of the last bridge device is connected to the other terminal of the electric power source boosted by the boost converter composed of n bridge devices or the first bridge device is connected to one of the terminals of an electric power source boosted by the boost converter composed of n bridge devices and the boost converter composed of n bridge devices further comprises at least a switch which is connected to the last bridge device and to the other terminal of the electric power source boosted by the boost converter composed of n bridge devices.

Thus, the periodical pattern can be designed in such a way that the sum of the voltages between the input and the output of the bridge devices during each time interval can be arranged to be any integer number comprised between seven and minus seven times of the first positive value. The boost converter composed of n bridge devices can adapt its input and output power levels to a flexible number of input and output voltage levels.

According to a particular feature, for any time interval in a first subset of time intervals of the periodical pattern, the switch which is connected to the other terminal of the electric power source boosted by the boost converter composed of n bridge devices is conducting during the time intervals of the first subset and the sum of the voltages between the input and the output of the bridge devices during the time intervals of the first subset equals an integer number Kp times the first positive value.

Thus, the input voltage Vin can take the value Vout multiplied by Kp and divided by N when the main switch is conducting.

According to a particular feature, for any time interval in a second subset of time intervals of one periodical pattern, the switch which is connected to the other terminal of the electric power source boosted by the boost converter composed of n bridge devices is not conducting during the time intervals of the second subset and the sum of the voltages between the input and the output of the bridge devices during the time intervals of the second subset equals minus a non null integer number P times the first positive value.

Thus, the input voltage Vin can take the value Vout multiplied by (N−P) and divided by N when the main switch is not conducting.

According to a particular feature, the second subset of time intervals comprises Kp time intervals, the first subset comprises P time intervals and the number Kp equals the number of time intervals of the periodical pattern minus number P.

Thus, the input voltage Vin can take the value Vout multiplied by N−P and divided by N at all time intervals of the pattern, and the boost converter composed of n bridge devices can perform a boost ratio equal to N divided by N−P, where N and P can flexibly be chosen so as to realise the desired boost ratio. As a result, the number of boost ratios which can be achieved with the boost converter composed of n bridge devices is increased a lot. It is then easier to achieve the regulation of the output voltage as the number of boost ratios is increased.

According to a particular feature, the selected pattern is given by a permutation in times intervals of a periodical pattern.

Thus, by interleaving time intervals corresponding to the charge and discharge of one capacitor, it is possible to limit the voltage ripples due to these charges and discharges by increasing the frequency of charge cycles of the capacitor. Noticeably, this will have an effect on the efficiency of the boost converter composed of n bridge devices, as well as on the power source quality.

For example, photovoltaic sources will provide more power, as input voltage does not vary too much around the maximum power point (MPP).

Furthermore, by gathering time intervals corresponding to the charge and discharge of one capacitor, it is possible to limit the number of switch activations during the duration of the pattern, and the commutation losses due to switch activation can be reduced.

According to a particular feature, each number $k_i$ with i from one to n equals two to the power of i minus one.

Thus, it is mathematically possible to always determine full rank matrices for any step up ratio N/(N−P), N smaller or equal to two to the power of n, P smaller than N.

According to a particular feature, n is equal to three, $k_1$ equals one, $k_2$ equals two, $k_3$ equals four.

Thus, with only three bits, it is possible to realise up to twenty one duty cycles, including step up ratios 10/7 and 10/3, with N exceeding two to the power of n.

According to a particular feature, n is equal to four, $k_1$ equals one, $k_2$ equals one, K3 equals one and $k_4$ equals four.

Thus, it is possible to realise more step up ratios than with $k_1$ equals one, $k_2$ equals two, $k_3$ equals four, while limiting the number of capacitors of bridge devices having a large voltage rating to one instead of two. The manufacturing cost is reduced.

In addition, additional step up ratios can be realised, such as 9/7, 9/6, 9/3 and 9/2, while keeping voltage of capacitors of bridge devices to a stable value.

According to a particular feature, the method comprises further step of selecting among plural memorized periodical patterns, one pattern according to an expected value of the output voltage of the boost converter composed of n bridge devices.

Thus, the boost converter composed of n bridge devices can adapt the boost ratio resulting from a given periodical pattern to the one best matching the output voltage demand, e.g. of a load terminal consuming the power delivered by the boost converter composed of n bridge devices.

According to a particular feature, the number of time intervals is an integer number comprised between five to ten.

Thus, the boost converter composed of n bridge devices can perform boost ratios which are equal to 10/3 and 10/7. The number of boost ratios which can be achieved with boost converter composed of n bridge devices is raised by two.

Thus, the boost converter composed of n bridge devices can perform boost ratios which are equal to 8/1, 8/2, 8/3, 8/4, 8/5, 8/6 and 8/7. The number of boost ratios which can be achieved with boost converter composed of n bridge devices is raised by eight.

Thus, the boost converter composed of n bridge devices can perform boost ratios which are equal to 7/1, 7/2, 7/3, 7/4, 7/5 and 7/6. The number of boost ratios which can be achieved with boost converter is raised by six.

Thus, the boost converter composed of n bridge devices can perform boost ratios which are equal to 6/1 and 6/5. The number of boost ratios which can be achieved with boost converter composed of n bridge devices is raised by three.

Thus, the boost converter composed of n bridge devices can perform boost ratios which are equal to 5/1, 5/2, 5/3 and 5/4. The number of boost ratios which can be achieved with boost converter composed of n bridge devices is raised by four.

The number of boost ratios which can be realised with the boost converter composed of n bridge devices becomes very important. For photovoltaic sources, the boost converter composed of n bridge devices can easily adapt its boost ratio to any value needed for a given maximum power point input voltage to meet the output voltage regulation constraints.

The characteristics of the invention will emerge more clearly from a reading of the following description of an example embodiment, the said description being produced with reference to the accompanying drawings, among which:

FIG. 3b represents a table representing different step-up ratios that can be provided according to the present invention when the boost converter comprises four bridge devices;

FIG. 4c represents a table representing the switching states of the switches of the third example of boost converter composed of four bridge devices in order to obtain different voltages on the bridges of the boost converter composed of four bridge devices;

FIG. 4d represents a table representing the switching states of the switches of the fourth example of boost converter composed of four bridge devices in order to obtain different voltages on the bridges of the boost converter composed of four bridge devices;

FIGS. 5a to 5h are examples of voltage values on the bridges of the boost converter composed of three bridges in order to have different step-up ratios when the periodical pattern is decomposed into eight time intervals;

FIGS. 6a to 6f are example of voltage values on the bridges of the boost converter composed of three bridges in order to have different step-up ratios when the periodical pattern is decomposed into seven time intervals;

FIGS. 7a and 7b are examples of voltage values on the bridges of the boost converter composed of three bridges in order to have different step-up ratios when the periodical pattern is decomposed into ten time intervals;

FIGS. 8a to 8c are examples of voltage values on the bridges of the boost converter composed of three bridges in order to have different step-up ratios when the periodical pattern is decomposed into six time intervals;

FIGS. 9a to 9d are example of voltage values on the bridges of the boost converter composed of three bridges in order to have different step-up ratios when the periodical pattern is decomposed into five time intervals;

FIGS. 10a and 10b are examples of voltage values on the bridges of the boost converter composed of four bridges in order to have different step-up ratios when the periodical pattern is decomposed into ten time intervals;

FIGS. 11a to 11d are examples of voltage values on the bridges of the boost converter composed of four bridges in order to have different step-up ratios when the periodical pattern is decomposed into nine time intervals;

FIGS. 12a to 12g are examples of voltage values on the bridges of the boost converter composed of four bridges in order to have different step-up ratios when the periodical pattern is decomposed into eight time intervals;

FIGS. 13a to 13f are examples of voltage values on the bridges of the boost converter composed of four bridges in order to have different step-up ratios when the periodical pattern is decomposed into seven time intervals;

FIGS. 14a and 14b are examples of voltage values on the bridges of the boost converter composed of four bridges in order to have different step-up ratios when the periodical pattern is decomposed into six time intervals;

FIG. 1a is a first example of boost converter composed of three bridge devices.

The boost converter composed of three bridge devices is also named Reactor Less Boost Converter, herein named RLBC.

Figure 1A:
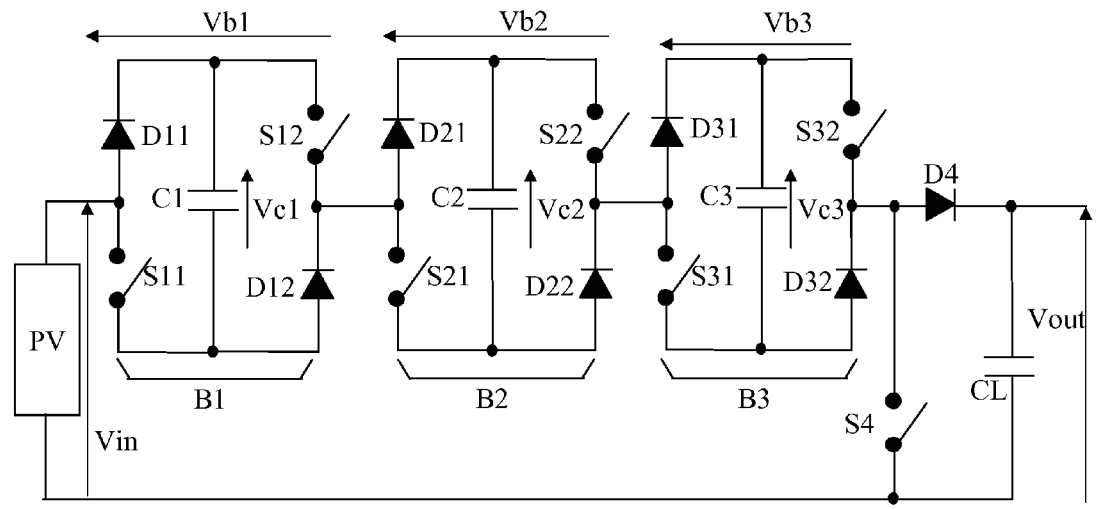
FIG. 1a is a first example of a boost converter composed of three bridge devices.

Basically, the inductor of the conventional DC/DC Boost converter is replaced by "n" bridge devices connected in series. Each bridge device is composed of four switches and a capacitor as shown in FIG. 1a. It has to be noted here that two switches may be under the form of diodes acting as switches. This individual bridge structure is also named "bit". The boost converter composed of three bridge devices also contains an output stage comprising a diode D4 and a switch S4.

In the FIG. 1a, three bits or bridge devices B1, B2 and B3 are shown and are connected in series; the third bit B3 is connected to the output stage.

A boost converter composed of a more important of bridge devices can be obtained by duplicating the bit B1 as much as necessary as it will be disclosed hereinafter in FIGS. 1c and 1d.

The bit B1 is composed of two diodes D11 and D12, two switches S11 and S12 and one capacitor C1.

The bit B2 is composed of two diodes D21 and D22, two switches S21 and S22 and one capacitor C2.

The bit B3 is composed of two diodes D31 and D32, two switches S31 and S32 and one capacitor C3.

The output stage is also connected to a capacitor CL.

For each bit Bi with i=1, 2 or 3, the anode of the diode Di1 is linked to the first terminal of the switch Si1. The cathode of Di1 is linked to the first terminal of the switch Si2 and to the positive terminal of the capacitor Ci. The second terminal of the switch Si1 is linked to the negative terminal of the capacitor Ci and to the anode of the diode Di2. The cathode of the diode Di2 is linked to the second terminal of the switch Si2.

Electric DC providing means like photovoltaic elements PV provide an input voltage Vin. The positive terminal of electric DC providing means is connected to the anode of the diode D11.

The cathode of the diode D12 is connected to the anode of the diode D21.

The cathode of the diode D22 is connected to the anode of the diode D31.

The cathode of the diode D32 is linked to the first terminal of the switch S4 and to the anode of the diode D4. The cathode of D4 is linked to the positive terminal of the capacitor CL. The second terminal of the switch S4 is linked to the negative terminal of the capacitor CL and to the negative terminal of electric DC providing means.

The voltage on the capacitor CL is equal to Vout.

The difference of voltage between the input and the output of B1 is named Vb1, the difference of voltage between the input and the output of B2 is named Vb2 and the difference of voltage between the input and the output of B3 is named Vb3.

The difference of voltage in C1 is named Vc1, the difference of voltage in C2 is named Vc2 and the difference of voltage in C3 is named Vc3.

The main difference between conventional Boost converters and the RLBC relies on the fact that the latter can only achieve some discrete values of voltage step-up ratio (and consequently of values of duty-cycles D, where ratio=1/(1−D)), which are dependent on the number of available "bits". This number of discrete values of step-up ratio respects the law:

$$n_{ratios} = 2^n$$

where "$n_{ratios}$" is the total number of possible step-up ratios (or duty-cycles) and "n" is the number of bits connected in series.

The voltage values imposed in each bit may respect the following law:

$$[Vc1:Vc2:\ldots:Vcn] = [1:2:\ldots 2^{(n-1)}]Vout/2^n$$

where "Vout" is the stepped-up output voltage. In a similar way, the possible ratios and consequent duty-cycles (D) respect the following laws:

$$ratio_i = 2^n/(2^n - j), i=1,2,\ldots,n_{ratios} \text{ and } j=i-1$$

$$D_i = 1 - 1/ratio_i, i=1,2,\ldots,n_{ratios}$$

Finally, for obtaining a constant output voltage, it is possible to have "$n_{ratios}$" different input voltages, which will respect the following law:

$$Vin = Vout/ratio_i, i=1,2,\ldots n_{ratios}$$

In order to guarantee the right operation of the converter, for all of these "$n_{ratios}$" possibilities, the following relationship is respected:

$$\sum_{i=1}^{k} Vci = Vout * (1 - 1/(n_{ratios})),$$

i=1, 2, ... n.

Figure 1B:
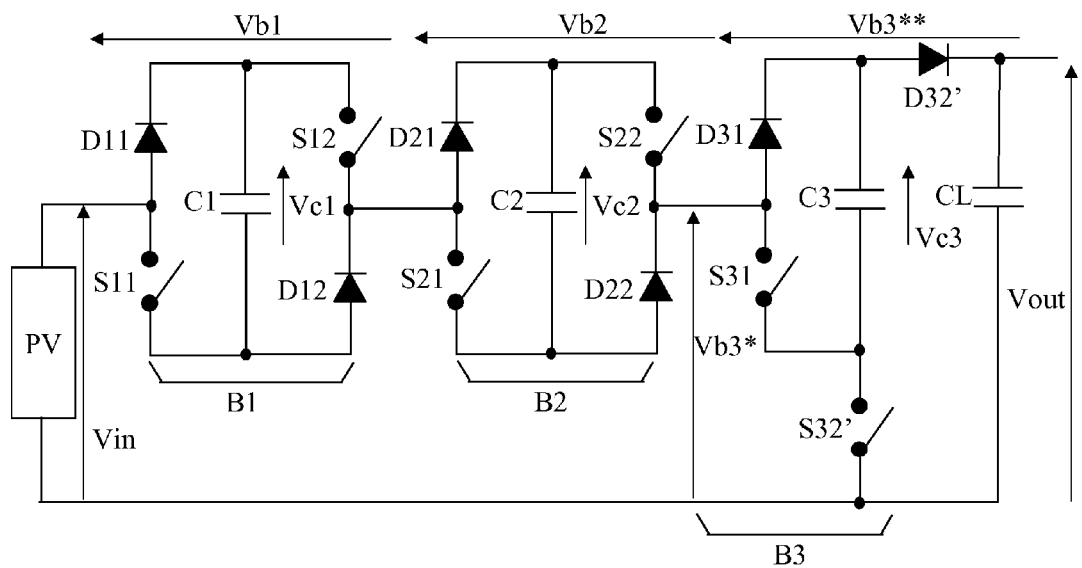
FIG. 1b is a second example of a boost converter composed of three bridge devices.

For the case n=3 bits of FIGS. 1a and 1b, [Vc1:Vc2:Vc3]=[1:2:4]Vref. The switching pattern of the switches of each bridge Bi is defined so as to offer a voltage Vbi at the connectors of the bridge that equals +Vci, −Vci, or 0, where Vci is the voltage of the capacitor Ci. Moreover, the switching pattern of each bit Bi is timely defined as a succession of $2^n$ equal sub periods ΔT of the main switch period T=1/f. RLBC with [1:2:4] configuration have several drawbacks.

In such case, only "$2^n$" possible discrete ratios/duty-cycles can be realised. For the n=3 bits case, only eight different boost-ratios are possible. Therefore, the regulation of the output voltage becomes difficult to realise. As duty cycle can not smoothly be selected, the output voltage must be regulated in a quite big range for a given range of input voltage. However, the range of output voltage of boost converter can not be large for specific applications, such as inverter.

Vci voltage is deterministically defined for each discrete duty cycle (Vci=$2^{i-1}$*Vout/$2^n$). This leaves no flexibility to design the power circuit with components which are rated for a maximum voltage level. Selecting a component with high rated voltage level might increase the cost of the circuit, and might also increase the switching power losses of the components.

The charge and discharge pattern of each capacitor is fixed for a given duty cycle, and different across capacitors, sometimes leading to high level of RMS current level passing through each bit. High RMS levels of current typically degrade the lifetime of the capacitors.

The present invention aims to increase the number of different boost-ratios.

The present invention is particularly suited, for example of cost purpose, when the RLBC is composed of three bits B1, B2 and B3 and wherein [Vc1:Vc2:Vc3]=[1:2:4]Vref.

The present invention is also adapted for a more important number of bits as it will be disclosed hereinafter in reference to the FIGS. 1c and 1d.

Figure 1C:
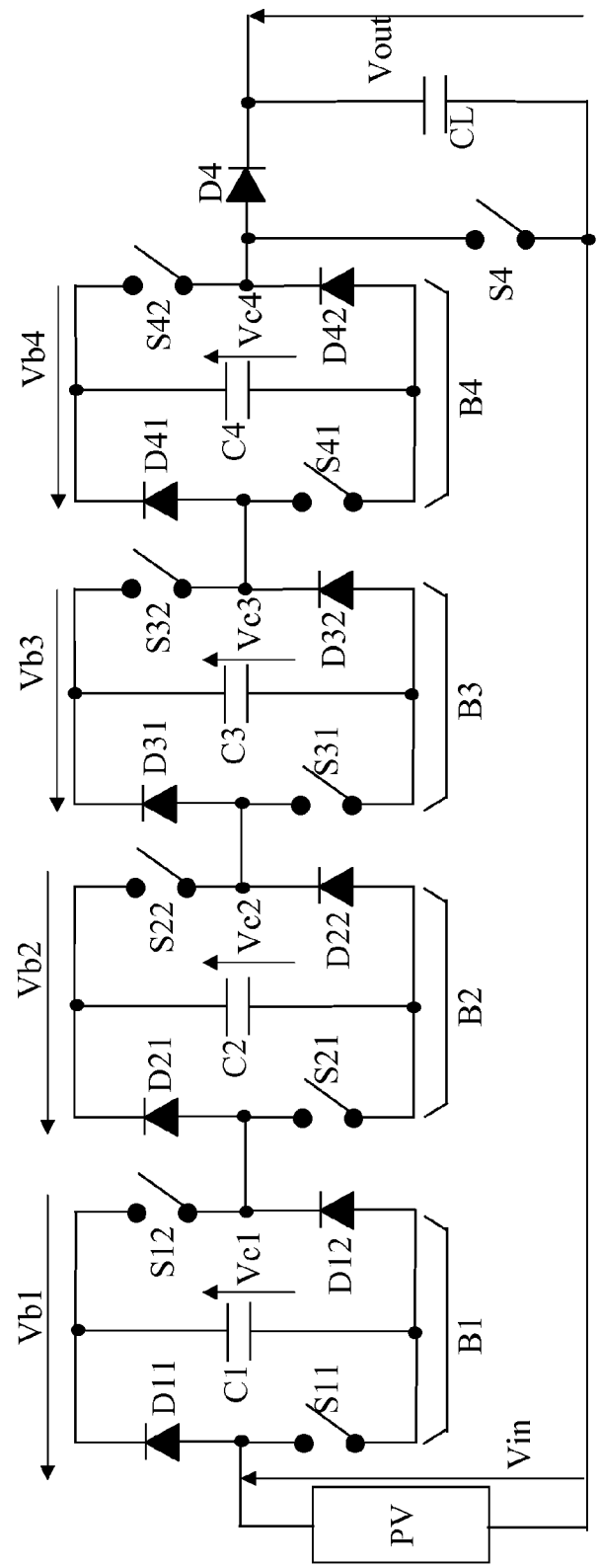
FIG. 1c is a third example of a boost converter composed of four bridge devices.
Figure 1D:
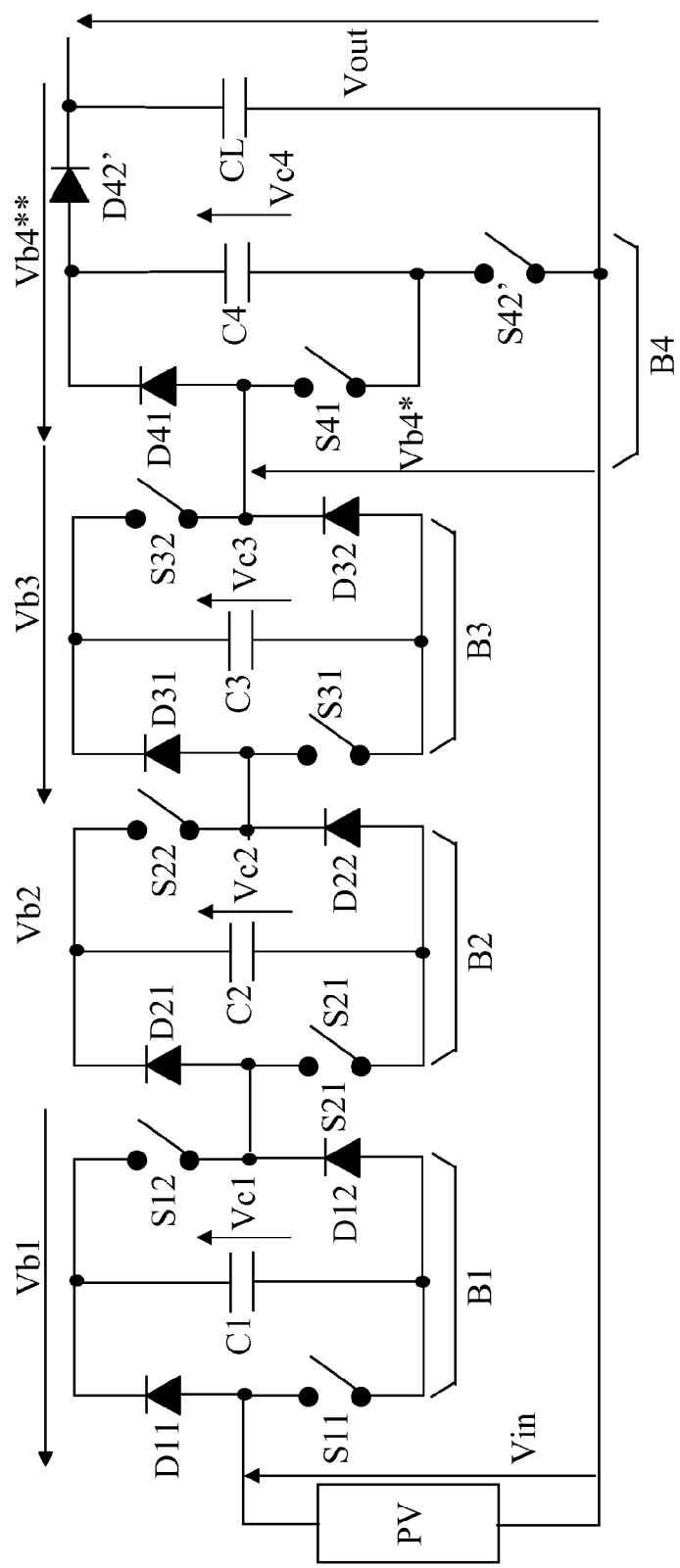
FIG. 1d is a fourth example of a boost converter composed of four bridge devices.

Let us now define the switching command laws of RLBC circuit. Basically, each bit voltage Vbi . . . Vb3 is expressed as a function of time by:

$$Vbi = \sum_{j=1}^{N} Vbij \Lambda(t - j\Delta T)$$

with i=1 to 3 for the examples of FIGS. 1a and 1b or i=1 to 4 for the examples of FIGS. 1c and 1d.

Λ(t) represents the step function of time interval width ΔT, NΔT represents the duration of switching cycle of switch S4. As for the control command law of switch Si1, Si2 can take their value in {0; 1}, voltage Vbij takes values in {−Vci, 0; Vci} at the jth time interval Tj according to the law $$\epsilon_{i,j} = 1 - Si1_j - Si2_j$$

Si1$_k$ and Si2$_j$ are equal to one when the switches Si1$j$ and Si2 are in ON state or conductive state at the jth time interval Tj and are equal to null value when the switches Si1$j$ and Si2 are in OFF state or non conductive state at the jth time interval Tj.

Let us further assume that Vbi is defined as an integer number of a reference voltage number, we get the following equation:

$$Vbij = \epsilon_{ij} 2^{i-1} V_{ref}$$

If we now apply the voltage balancing condition of RLBC circuit in the conduction mode (S4=1), then during the N−P first time intervals of the switching cycle of switch S4, we get:

$$\forall j \leq P \; Vin = \sum_i Vbij$$

If we now apply the voltage balancing condition of RLBC circuit in the discontinuous mode (S4=0), then during the N−P last time intervals of the switching cycle of switch S4, we get:

$$\forall j > P \; Vin = \sum_i Vbij + Vout$$

Under steady state analysis, the balance of each capacitor charge should be verified, this can be expressed by:

$$\forall i \leq K \; \sum_{j=1}^{N} \epsilon_{ij} = 0$$

With above conditions met, the boost behaviour can be verified if we compute the following terms:

$$\sum_{j=1}^{N} \sum_{i=1}^{n} Vbij = \sum_{j=1}^{P} \sum_{i=1}^{n} Vbij + \sum_{j=P+1}^{N} \sum_{i=1}^{n} Vbij$$
$$= P(Vin) + (N - P)(Vin - Vout)$$
$$= (P - N)Vout + NVin \sum_{j=1}^{N} \sum_{i=1}^{n} Vbij$$
$$= \sum_{j=1}^{N} \sum_{i=1}^{n} 2^{i-1} V_{ref} \epsilon_{ij}$$
$$= \sum_{i=1}^{n} 2^{i-1} V_{ref} \sum_{j=1}^{N} \epsilon_{ij}$$
$$= 0$$

$$Vout = \frac{N}{N - P} Vin$$

Where n is equal to the number of bits.

This proves that the boost conversion of ratio D=N/N−P can be realised provided that conditions $$Vin - \sum_i Vbij = 0,$$

$$Vin = \sum_i Vbij + Vout$$

-continued and $$\sum_{j=1}^{N} \varepsilon_{ij} = 0$$

are met.

$$\forall j \leq P \sum_{i} Vbij = V_{ref} \sum_{i} \varepsilon_{ij} k_i \quad (a)$$
$$= Vin$$

$$\forall j > P \sum_{i} Vbij = V_{ref} \sum_{i} \varepsilon_{ij} k_i \quad (b)$$
$$= Vin - Vout$$
$$= \frac{P}{N-P} Vout$$

with $k_i$, the ith coefficient of K equals 1, 2 or 4 for the examples of FIGS. 1a and 1b and $k_i$, the ith coefficient of K equals 1, 1, 1 or 4 for the examples of FIGS. 1c and 1d.

Let us now introduce the following term $\Omega_j$:

$$\Omega_j = \sum_{i} k_i \varepsilon_{ij}$$

From (a) and (b), we can obtain:

$$\forall j \leq P, \Omega_j = Vin/V_{ref} = \alpha(N-P)$$
$$\forall j > P, \Omega_j = -\frac{P}{N-P} Vin/V_{ref} = -P\alpha$$
$$\alpha = \frac{Vin/V_{ref}}{N-P}$$

It should be noted that, as $V_{ref}$ can be set arbitrarily, we can decide to let $\alpha$ equal to 1 and $Vci = 2^{i-1} V_{ref}$. Thus, it is enough to find a set of switching rules $\{\varepsilon_{ij}\}$ $$\begin{cases} \forall j \leq P, \Omega_j = N-P \\ \forall j > P, \Omega_j = -P \end{cases}$$

It should be noted that $V_{ref}$ can be further expressed as $$V_{ref} = \frac{Vout}{N}$$

Finding a solution to the switching pattern of RLBC with n bits consists, for a given pair of integers {N, P} and a given vector K of integers, in finding a matrix ($\epsilon$) of size (N×n) and with elements in {−1; 0; 1} such that
(i) the matrix ($\epsilon$) verifies $$\forall i \leq K \sum_{j=1}^{N} \varepsilon_{ij} = 0$$

and (ii) $\vec{\Omega} = (\Omega_1; \Omega_2; \ldots; \Omega_N) = (\epsilon) \cdot \vec{K}$ has P elements of value in N−P, and N−P elements of values −P.

If the matrix ($\epsilon$) is of rank n, then vector K is the unique vector K which yields the desired vector $\Omega$. If matrix ($\epsilon$) is not of rank n, then there exists an entire subspace of non null dimension of integer vectors K which satisfy the conditions to solving the RLBC switching pattern. There is then few chance that the RLBC circuit will effectively converge to the desired integer vector K from application of the single switching pattern defined by matrix ($\epsilon$). The voltage of RLBC capacitor can then potentially reach higher voltage values than expected.

In contrast, having a unique and controlled vector K yielding the term $\Omega_j$ ensures stability of voltage of each bit capacitor $C_i$ to desired voltage value $k_i * V_{out}/N$.

If ($\epsilon_3$) is a suitable switching pattern solution of rank 3 to the [1 2 4] RLBC problem, one could have envisaged to build a matrix ($\epsilon_4$) solving the [1 1 1 4] RLBC problem, by simple duplication of second line of matrix ($\epsilon_3$), so as to reflect that second bit of [1 2 4] configuration is now split as second and third bits of configuration [1 1 1 4]. Such matrix ($\epsilon_4$) is indeed a solution matrix to this problem, but then, any vector K [1 a b 4] where a+b=2 would also be an appropriate vector K for that matrix ($\epsilon_4$), and using matrix ($\epsilon_4$) can not guarantee alone to lead to stable voltage of bit capacitors two and three to desired value $V_{out}/N$. It can fluctuate anywhere from 0 to $2*V_{out}/N$. Charge migration from one capacitor to the other can be anticipated if duration of time intervals are not strictly identical.

In a variant, the matrix ($\epsilon$) has some lines set to zero, reflecting that only a subset of bits are actually used. In such case, the capacitors of bridges corresponding to the lines set to zero can be said as bypassed, as are neither charged nor discharged during the duration of the periodical pattern. The voltage of bypassed capacitors can be left flexible, what really matters is to control the voltage of capacitor which are effectively being charged and discharged by the current passing from the input power source. In such case, unicity of solution of subvector K corresponding to bits actually being used can be realised if the matrix is of rank the number of active bits.

In the present invention $K = [1, 2, \ldots, 2^{n-1}]^T$ in the examples of FIGS. 1a and 1b, and each matrix disclosed in FIGS. 5 to 9 verifies the conditions (i) and (ii) and are all of rank the number of non null lines.

In the present invention $K = [1,1,1,4]^T$ in the examples of FIGS. 1c and 1d, and each matrix disclosed in FIGS. 10 to 14 verifies the conditions (i) and (ii), and are all of rank the number of non null lines.

FIG. 1b is a second example of boost converter composed of three bridge devices.

As it has been disclosed in reference to the FIG. 1a, the inductor of the conventional DC/DC Boost converter is replaced by "n" capacitor bridges connected in series. Each bridge is composed of four switches and a capacitor as shown in FIG. 1. This individual bridge structure is also named "bit".

In the FIG. 1b, three bits B1, B2 and B3 are shown.

A boost converter composed of a more important of bridge devices can be obtained by duplicating the bit B1 as much as necessary.

The bit B1 is composed of two diodes D11 and D12, two switches S11 and S12 and one capacitor C1.

The bit B2 is composed of two diodes D21 and D22, two switches S21 and S22 and one capacitor C2.

The bit B3 is composed of two diodes D31 and D32', two switches S31 and S32' and one capacitor C3.

For each bit Bi with i=1 or 2, the anode of the diode Di1 is linked to the first terminal of the switch Si1. The cathode of Di1 is linked to the first terminal of the switch Si2 and to the positive terminal of the capacitor Ci. The second terminal of the switch Si1 is linked to the negative terminal of the capacitor Ci and to the anode of the diode Di2. The cathode of the diode Di2 is linked to the second terminal of the switch Si2.

The anode of the diode D31 is linked to the first terminal of the switch S31. The cathode of D31 is linked to the positive terminal of the capacitor C3 and to the anode of the diode D32'. The second terminal of the switch S31 is linked to the negative terminal of the capacitor C3 and to the first terminal of the switch S32'.

Electric DC providing means like photovoltaic elements PV provide an input voltage Vin. The positive terminal of electric DC providing means is connected to the anode of the diode D11.

The cathode of the diode D12 is connected to the anode of the diode D21.

The cathode of the diode D22 is connected to the anode of the diode D31.

The cathode of the diode D32' is connected to the positive terminal of the capacitor CL.

The negative terminal of the capacitor CL and the second terminal of the switch S32' are connected to the negative terminal of electric DC providing means.

The switch S32' acts similarly to switch S4 of FIG. 1a and the diode D32' acts as diode D4 of FIG. 1a.

The voltage on the capacitor CL is equal to Vout.

The difference of voltage between the input and the output of B1 is named Vb1, the difference of voltage between the input and the output of B2 is named Vb2 and the difference of voltage between the input and the output of B3 is named Vb3. Vb3 equals Vb3* when switch S32' is on, and equals Vb3** when switch S32' is off.

FIG. 1c is a third example of a boost converter composed of four bridge devices.

Basically, the inductor of the conventional DC/DC Boost converter is replaced by "n" bridge devices connected in series. Each bridge device is composed of four switches and a capacitor as shown in FIG. 1c. It has to be noted here that two switches may be under the form of diodes acting as switches. This individual bridge structure is also named "bit". The boost converter composed of four bridge devices also contains an output stage comprising a diode D4 and a switch S4.

According to the invention, in the FIG. 1a, four bits or bridge devices B1, B2, B3 and B4 are shown and are connected in series; the fourth bit B4 is connected to the output stage.

The bit B1 is composed of two diodes D11 and D12, two switches S11 and S12 and one capacitor C1.

The bit B2 is composed of two diodes D21 and D22, two switches S21 and S22 and one capacitor C2.

The bit B3 is composed of two diodes D31 and D32, two switches S31 and S32 and one capacitor C3.

The bit B4 is composed of two diodes D41 and D42, two switches S41 and S42 and one capacitor C4.

The output stage is also connected to a capacitor CL.

A boost converter composed of a more important of bridge devices can be obtained by duplicating the bit B1 as much as necessary.

For each bit Bi with i=1, 2, 3 or 4, the anode of the diode Di1 is linked to the first terminal of the switch Si1. The cathode of Di1 is linked to the first terminal of the switch Si2 and to the positive terminal of the capacitor Ci. The second terminal of the switch Si1 is linked to the negative terminal of the capacitor Ci and to the anode of the diode Di2. The cathode of the diode Di2 is linked to the second terminal of the switch Si2.

Electric DC providing means like photovoltaic elements PV provide an input voltage Vin. The positive terminal of electric DC providing means is connected to the anode of the diode D11.

The cathode of the diode D12 is connected to the anode of the diode D21.

The cathode of the diode D22 is connected to the anode of the diode D31.

The cathode of the diode D32 is connected to the anode of the diode D41.

The cathode of the diode D42 is linked to the first terminal of the switch S4 and to the anode of the diode D4. The cathode of D4 is linked to the positive terminal of the capacitor CL. The second terminal of the switch S4 is linked to the negative terminal of the capacitor CL and to the negative terminal of electric DC providing means PV.

The voltage on the capacitor CL is equal to Vout.

The difference of voltage between the input and the output of B1 is named Vb1, the difference of voltage between the input and the output of B2 is named Vb2, the difference of voltage between the input and the output of B3 is named Vb3 and the difference of voltage between the input and the output of B4 is named Vb4.

The difference of voltage in C1 is named Vc1, the difference of voltage in C2 is named Vc2, the difference of voltage in C3 is named Vc3 and the difference of voltage in C4 is named Vc4.

FIG. 1d is a fourth example of a boost converter composed of four bridge devices.

As it has been disclosed in reference to the FIG. 1c, the inductor of the conventional DC/DC Boost converter is replaced by "n" capacitor bridges connected in series.

In the FIG. 1d, four bits B1, B2, B3 and B4 are shown.

The bit B1 is composed of two diodes D11 and D12, two switches S11 and S12 and one capacitor C1.

The bit B2 is composed of two diodes D21 and D22, two switches S21 and S22 and one capacitor C2.

The bit B3 is composed of two diodes D31 and D32, two switches S31 and S32 and one capacitor C3.

The bit B4 is composed of two diodes D41 and D42', two switches S41 and S42' and one capacitor C4.

A boost converter composed of a more important of bridge devices can be obtained by duplicating the bit B1 as much as necessary.

For each bit Bi with i=1 to 3, the anode of the diode Di1 is linked to the first terminal of the switch Si1. The cathode of Di1 is linked to the first terminal of the switch Si2 and to the positive terminal of the capacitor Ci. The second terminal of the switch Si1 is linked to the negative terminal of the capacitor Ci and to the anode of the diode Di2. The cathode of the diode Di2 is linked to the second terminal of the switch Si2.

The anode of the diode D41 is linked to the first terminal of the switch S41. The cathode of D41 is linked to the positive terminal of the capacitor C4 and to the anode of the diode D42'. The second terminal of the switch S41 is linked to the negative terminal of the capacitor C4 and to the first terminal of the switch S42'.

Electric DC providing means like photovoltaic elements PV provide an input voltage Vin. The positive terminal of electric DC providing means is connected to the anode of the diode D11.

The cathode of the diode D12 is connected to the anode of the diode D21.

The cathode of the diode D22 is connected to the anode of the diode D31.

The cathode of the diode D32 is connected to the anode of the diode D41.

The cathode of the diode D42' is connected to the positive terminal of the capacitor CL.

The negative terminal of the capacitor CL and the second terminal of the switch S32' are connected to the negative terminal of electric DC providing means.

The switch S42' acts similarly to switch S4 of FIG. 1a and the diode D42' acts as diode D4 of FIG. 1a.

The voltage on the capacitor CL is equal to Vout.

The difference of voltage between the input and the output of B1 is named Vb1, the difference of voltage between the input and the output of B2 is named Vb2, the difference of voltage between the input and the output of B3 is named Vb3 and the difference of voltage between the input and the output of B4 is named Vb4. Vb4 equals Vb4* when switch S42' is on, and equals Vb4** when switch S42' is off.

Figures 2, 3A:
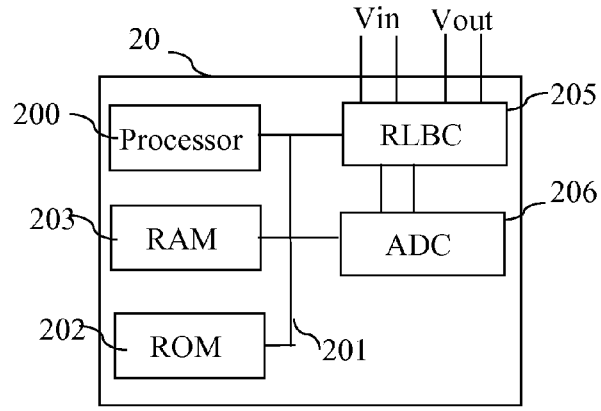
FIG. 2 represents an example of a device comprising a boost converter composed of n bridge devices.
FIG. 3a represents a table representing different step-up ratios that can be provided according to the present invention when the boost converter comprises three bridge devices.

FIG. 2 represents an example of a device comprising a boost converter composed of n bridge devices.

Figure 16:
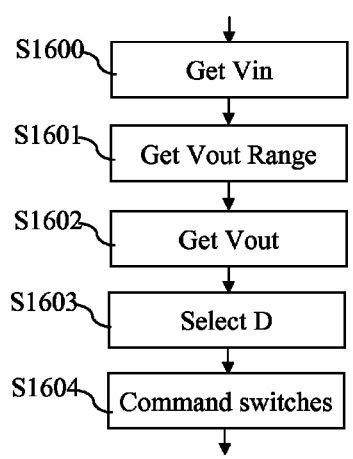
FIG. 16 is an example of an algorithm for determining which switch commands have to be used for the boost converter composed of composed bridge devices.

The device 20 has, for example, an architecture based on components connected together by a bus 201 and a processor 200 controlled by the program related to the algorithm as disclosed in the FIG. 16.

It has to be noted here that the device 20 is, in a variant, implemented under the form of one or several dedicated integrated circuits which execute the same operations as the one executed by the processor 200 as disclosed hereinafter.

The bus 201 links the processor 200 to a read only memory ROM 202, a random access memory RAM 203, an analogue to digital converter ADC 206 and the RLBC module as the one disclosed in FIG. 1.

The read only memory ROM 202 contains instructions of the program related to the algorithm as disclosed in the FIG. 16 which are transferred, when the device 20 is powered on to the random access memory RAM 203.

The read only memory ROM 202 memorizes the tables shown in FIGS. 3 to 14 of the present invention.

The RAM memory 203 contains registers intended to receive variables, and the instructions of the program related to the algorithm as disclosed in the FIG. 16.

The analogue to digital converter 206 is connected to the RLBC and converts voltages representative of the input voltage Vin and/or the output voltage Vout into binary information.

FIG. 3a represents a table representing different step-up ratios that can be provided according to the present invention when the boost converter comprises three bridge devices.

The table of the FIG. 3a comprises six columns noted 300 to 306. The column 300 shows different values of the input voltage Vin applied on the RLBC. The column 301 shows the output voltage Vout of the RLBC. The output voltage is equal to 240 Volts. The column 302 shows the different ratios between the output voltage Vout and the input voltage Vin. The column 303 shows the different duty cycles D of the RLBC. The column 304 shows the different values of the couples N and P. The column 305 shows the different values of the reference voltage $V_{ref}$. The column 306 shows the Figs to be selected according to the input voltage value Vin.

In line 310, the input voltage is equal to 30 Volts, the output voltage is 240 Volts, the ratio Vout/Vin equals 8, the duty cycle D equals 0.875, the couple (N,P) equals (8,7), the reference voltage $V_{ref}$ equals 30 Volts and the switching pattern to select in order to get the ratio of 8 is disclosed in the FIG. 5a.

In line 311, the input voltage is equal to 34.33 Volts, the output voltage is 240 Volts, the ratio Vout/Vin equals 7, the duty cycle D equals 0.857, the couple (N,P) equals (7,6), the reference voltage $V_{ref}$ equals 34.28 Volts and the switching pattern to select in order to get the ratio of 7 is disclosed in the FIG. 6a.

In line 312, the input voltage is equal to 40 Volts, the output voltage is 240 Volts, the ratio Vout/Vin equals 6, the duty cycle D equals 0.833, the couple (N,P) equals (6,5), the reference voltage $V_{ref}$ equals 40 Volts and the switching pattern to select in order to get the ratio of 4 is disclosed in the FIG. 8a.

In line 313, the input voltage is equal to 48 Volts, the output voltage is 240 Volts, the ratio Vout/Vin equals 5, the duty cycle D equals 0.8, the couple (N,P) equals (5,4), the reference voltage $V_{ref}$ equals 48 Volts and the switching pattern to select in order to get the ratio of 5 is disclosed in the FIG. 9a.

In line 314, the input voltage is equal to 60 Volts, the output voltage is 240 Volts, the ratio Vout/Vin equals 4, the duty cycle D equals 0.75, the couple (N,P) equals (8,6), the reference voltage $V_{ref}$ equals 30 Volts and the switching pattern to select in order to get the ratio of 4 is disclosed in the FIG. 5b.

In line 315, the input voltage is equal to 68.66 Volts, the output voltage is 240 Volts, the ratio Vout/Vin equals 3.5, the duty cycle D equals 0.714, the couple (N,P) equals (7,5), the reference voltage $V_{ref}$ equals 34.28 Volts and the switching pattern to select in order to get the ratio of 3.5 is disclosed in the FIG. 6b.

In line 316, the input voltage is equal to 72 Volts, the output voltage is 240 Volts, the ratio Vout/Vin equals 3.33, the duty cycle D equals 0.7, the couple (N,P) equals (10,7), the reference voltage $V_{ref}$ equals 24 Volts and the switching pattern to select in order to get the ratio of 3.33 is disclosed in the FIG. 7a.

In line 317, the input voltage is equal to 90 Volts, the output voltage is 240 Volts, the ratio Vout/Vin equals 2.66, the duty cycle D equals 0.625, the couple (N,P) equals (8,5), the reference voltage $V_{ref}$ equals 30 Volts and the switching pattern to select in order to get the ratio of 2.66 is disclosed in the FIG. 5c or 5d.

In line 318, the input voltage is equal to 96 Volts, the output voltage is 240 Volts, the ratio Vout/Vin equals 2.5, the duty cycle D equals 0.6, the couple (N,P) equals (5,3), the reference voltage $V_{ref}$ equals 48 Volts and the switching pattern to select in order to get the ratio of 2.5 is disclosed in the FIG. 9b.

In line 319, the input voltage is equal to 103 Volts, the output voltage is 240 Volts, the ratio Vout/Vin equals 2.33, the duty cycle D equals 0.571, the couple (N,P) equals (7,4), the reference voltage $V_{ref}$ equals 34.28 Volts and the switching pattern to select in order to get the ratio of 3.33 is disclosed in the FIG. 6c.

In line 320, the input voltage is equal to 120 Volts, the output voltage is 240 Volts, the ratio Vout/Vin equals 2, the duty cycle D equals 0.5, the couple (N,P) equals (8,4), the reference voltage $V_{ref}$ equals 30 Volts and the switching pattern to select in order to get the ratio of 2 is disclosed in the FIG. 5e.

In line 321, the input voltage is equal to 137 Volts, the output voltage is 240 Volts, the ratio Vout/Vin equals 1.75, the duty cycle D equals 0.428, the couple (N,P) equals (7,3), the reference voltage $V_{ref}$ equals 34.28 Volts and the switching pattern to select in order to get the ratio of 1.75 is disclosed in the FIG. 6d.

In line 322, the input voltage is equal to 144.66 Volts, the output voltage is 240 Volts, the ratio Vout/Vin equals 1.66, the duty cycle D equals 0.4, the couple (N,P) equals (5,2), the reference voltage $V_{ref}$ equals 48 Volts and the switching pattern to select in order to get the ratio of 1.66 is disclosed in the FIG. 9c.

In line 323, the input voltage is equal to 150 Volts, the output voltage is 240 Volts, the ratio Vout/Vin equals 1.6, the duty cycle D equals 0.375, the couple (N,P) equals (8,3), the reference voltage $V_{ref}$ equals 30 Volts and the switching pattern to select in order to get the ratio of 1.6 is disclosed in the FIG. 5f.

In line 324, the input voltage is equal to 169 Volts, the output voltage is 240 Volts, the ratio Vout/Vin equals 1.42, the duty cycle D equals 0.3, the couple (N,P) equals (10,3), the reference voltage $V_{ref}$ equals 24 Volts and the switching pattern to select in order to get the ratio of 1.42 is disclosed in the FIG. 7b.

In line 325, the input voltage is equal to 171.4 Volts, the output voltage is 240 Volts, the ratio Vout/Vin equals 1.4, the duty cycle D equals 0.285, the couple (N,P) equals (7,2), the reference voltage $V_{ref}$ equals 34.28 Volts and the switching pattern to select in order to get the ratio of 1.4 is disclosed in the FIG. 6e.

In line 326, the input voltage is equal to 180 Volts, the output voltage is 240 Volts, the ratio Vout/Vin equals 1.33, the duty cycle D equals 0.25, the couple (N,P) equals (8,2), the reference voltage $V_{ref}$ equals 30 Volts and the switching pattern to select in order to get the ratio of 1.33 is disclosed in the FIG. 5g.

In line 327, the input voltage is equal to 192 Volts, the output voltage is 240 Volts, the ratio Vout/Vin equals 1.25, the duty cycle D equals 0.2, the couple (N,P) equals (5,1), the reference voltage $V_{ref}$ equals 48 Volts and the switching pattern to select in order to get the ratio of 1.25 is disclosed in the FIG. 9d.

In line 328, the input voltage is equal to 200 Volts, the output voltage is 240 Volts, the ratio Vout/Vin equals 1.2, the duty cycle D equals 0.166, the couple (N,P) equals (6,1), the reference voltage $V_{ref}$ equals 40 Volts and the switching pattern to select in order to get the ratio of 1.2 is disclosed in the FIG. 8b or 8c.

In line 329, the input voltage is equal to 205.7 Volts, the output voltage is 240 Volts, the ratio Vout/Vin equals 1.16, the duty cycle D equals 0.142, the couple (N,P) equal (7,1), the reference voltage $V_{ref}$ equals 34.28 Volts and the switching pattern to select in order to get the ratio of 1.16 is disclosed in the FIG. 6f.

In line 330, the input voltage is equal to 210 Volts, the output voltage is 240 Volts, the ratio Vout/Vin equals 1.14, the duty cycle D equals 0.125, the couple (N,P) equal (8,1), the reference voltage $V_{ref}$ equals 30 Volts and the switching pattern to select in order to get the ratio of 1.14 is disclosed in the FIG. 5h.

FIG. 3b represents a table representing different step-up ratios that can be provided according to the present invention when the boost converter comprises four bridge devices.

The table of the FIG. 3b comprises six columns noted 350 to 356. The column 350 shows different values of the input voltage Vin applied on the RLBC. The column 351 shows the output voltage Vout of the RLBC. The output voltage is for example equal to 240 Volts. The column 352 shows the different ratios between the output voltage Vout and the input voltage Vin. The column 353 shows the different duty cycles D of the RLBC. The column 354 shows the different values of the couples N and P. The column 355 shows the different values of the reference voltage $V_{ref}$. The column 356 shows the Figs to be selected according to the input voltage value Vin.

In line 360, the input voltage is equal to 100 Volts, the output voltage is 800 Volts, the ratio Vout/Vin equals 8, the duty cycle D equals 0.875, the couple (N,P) equals (8,7), the reference voltage $V_{ref}$ equals 100 Volts and the switching pattern to select in order to get the ratio of 8 is disclosed in the FIG. 12a.

In line 361, the input voltage is equal to 114.3 Volts, the output voltage is 800 Volts, the ratio Vout/Vin equals 7, the duty cycle D equals 0.857, the couple (N,P) equals (7,6), the reference voltage $V_{ref}$ equals 144.3 Volts and the switching pattern to select in order to get the ratio of 7 is disclosed in the FIG. 13a.

In line 362, the input voltage is equal to 133.3 Volts, the output voltage is 800 Volts, the ratio Vout/Vin equals 6, the duty cycle D equals 0.833, the couple (N,P) equals (6,5), the reference voltage $V_{ref}$ equals 133.3 Volts and the switching pattern to select in order to get the ratio of 6 is disclosed in the FIG. 14b.

In line 363, the input voltage is equal to 177.7 Volts, the output voltage is 800 Volts, the ratio Vout/Vin equals 4.5, the duty cycle D equals 0.778, the couple (N,P) equals (9,7), the reference voltage $V_{ref}$ equals 88.9 Volts and the switching pattern to select in order to get the ratio of 4.5 is disclosed in the FIG. 11a.

In line 364, the input voltage is equal to 200 Volts, the output voltage is 800 Volts, the ratio Vout/Vin equals 4, the duty cycle D equals 0.75, the couple (N,P) equals (8,6), the reference voltage $V_{ref}$ equals 100 Volts and the switching pattern to select in order to get the ratio of 4 is disclosed in the FIG. 12b.

In line 365, the input voltage is equal to 228.6 Volts, the output voltage is 800 Volts, the ratio Vout/Vin equals 3.5, the duty cycle D equals 0.714, the couple (N,P) equals (7,5), the reference voltage $V_{ref}$ equals 114.3 Volts and the switching pattern to select in order to get the ratio of 3.5 is disclosed in the FIG. 13b.

In line 366, the input voltage is equal to 240 Volts, the output voltage is 800 Volts, the ratio Vout/Vin equals 3.33, the duty cycle D equals 0.7, the couple (N,P) equals (10,7), the reference voltage $V_{ref}$ equals 80 Volts and the switching pattern to select in order to get the ratio of 3.33 is disclosed in the FIG. 10a.

In line 367, the input voltage is equal to 266.7 Volts, the output voltage is 800 Volts, the ratio Vout/Vin equals 3, the duty cycle D equals 0.667, the couple (N,P) equals (9,6), the reference voltage $V_{ref}$ equals 88.9 Volts and the switching pattern to select in order to get the ratio of 3 is disclosed in the FIG. 11b.

In line 368, the input voltage is equal to 300 Volts, the output voltage is 800 Volts, the ratio Vout/Vin equals 2.67, the duty cycle D equals 0.625, the couple (N,P) equals (8,5), the reference voltage $V_{ref}$ equals 100 Volts and the switching pattern to select in order to get the ratio of 2.67 is disclosed in the FIG. 12c.

In line 369, the input voltage is equal to 342.9 Volts, the output voltage is 800 Volts, the ratio Vout/Vin equals 2.33, the duty cycle D equals 0.571, the couple (N,P) equals (7,4), the reference voltage $V_{ref}$ equals 114.3 Volts and the switching pattern to select in order to get the ratio of 2.33 is disclosed in the FIG. 13c.

In line 370, the input voltage is equal to 400 Volts, the output voltage is 800 Volts, the ratio Vout/Vin equals 2, the duty cycle D equals 0.5, the couple (N,P) equals (8,4), the reference voltage $V_{ref}$ equals 100 Volts and the switching pattern to select in order to get the ratio of 2 is disclosed in the FIG. 12d.

In line 371, the input voltage is equal to 457.1 Volts, the output voltage is 800 Volts, the ratio Vout/Vin equals 1.75, the duty cycle D equals 0.429, the couple (N,P) equals (7,3), the reference voltage $V_{ref}$ equals 114.3 Volts and the switching pattern to select in order to get the ratio of 1.75 is disclosed in the FIG. 13d.

In line 372, the input voltage is equal to 500 Volts, the output voltage is 800 Volts, the ratio Vout/Vin equals 1.6, the duty cycle D equals 0.375, the couple (N,P) equals (8,3), the reference voltage $V_{ref}$ equals 100 Volts and the switching pattern to select in order to get the ratio of 1.75 is disclosed in the FIG. 12e.

In line 373, the input voltage is equal to 533.3 Volts, the output voltage is 800 Volts, the ratio Vout/Vin equals 1.5, the duty cycle D equals 0.333, the couple (N,P) equals (9,3), the reference voltage $V_{ref}$ equals 88.9 Volts and the switching pattern to select in order to get the ratio of 1.5 is disclosed in the FIG. 11c.

In line 374, the input voltage is equal to 560 Volts, the output voltage is 800 Volts, the ratio Vout/Vin equals 1.42, the duty cycle D equals 0.3, the couple (N,P) equals (10,3), the reference voltage $V_{ref}$ equals 80 Volts and the switching pattern to select in order to get the ratio of 1.42 is disclosed in the FIG. 10b.

In line 375, the input voltage is equal to 571.4 Volts, the output voltage is 800 Volts, the ratio Vout/Vin equals 1.4, the duty cycle D equals 0.285, the couple (N,P) equals (7,2), the reference voltage $V_{ref}$ equals 114.3 Volts and the switching pattern to select in order to get the ratio of 1.4 is disclosed in the FIG. 13e.

In line 376, the input voltage is equal to 600 Volts, the output voltage is 800 Volts, the ratio Vout/Vin equals 1.33, the duty cycle D equals 0.25, the couple (N,P) equals (8,2), the reference voltage $V_{ref}$ equals 100 Volts and the switching pattern to select in order to get the ratio of 1.33 is disclosed in the FIG. 12f.

In line 377, the input voltage is equal to 622.2 Volts, the output voltage is 800 Volts, the ratio Vout/Vin equals 1.29, the duty cycle D equals 0.222, the couple (N,P) equals (9,2), the reference voltage $V_{ref}$ equals 88.9 Volts and the switching pattern to select in order to get the ratio of 1.29 is disclosed in the FIG. 11d.

In line 378, the input voltage is equal to 666.6 Volts, the output voltage is 800 Volts, the ratio Vout/Vin equals 1.2, the duty cycle D equals 0.167, the couple (N,P) equals (6,1), the reference voltage $V_{ref}$ equals 133.3 Volts and the switching pattern to select in order to get the ratio of 1.2 is disclosed in the FIG. 14a.

In line 379, the input voltage is equal to 685.7 Volts, the output voltage is 800 Volts, the ratio Vout/Vin equals 1.17, the duty cycle D equals 0.143, the couple (N,P) equals (7,1), the reference voltage $V_{ref}$ equals 114.3 Volts and the switching pattern to select in order to get the ratio of 1.17 is disclosed in the FIG. 13e.

In line 380, the input voltage is equal to 700 Volts, the output voltage is 800 Volts, the ratio Vout/Vin equals 1.14, the duty cycle D equals 0.125, the couple (N,P) equals (8,1), the reference voltage $V_{ref}$ equals 100 Volts and the switching pattern to select in order to get the ratio of 1.14 is disclosed in the FIG. 12g.

Figure 4A:
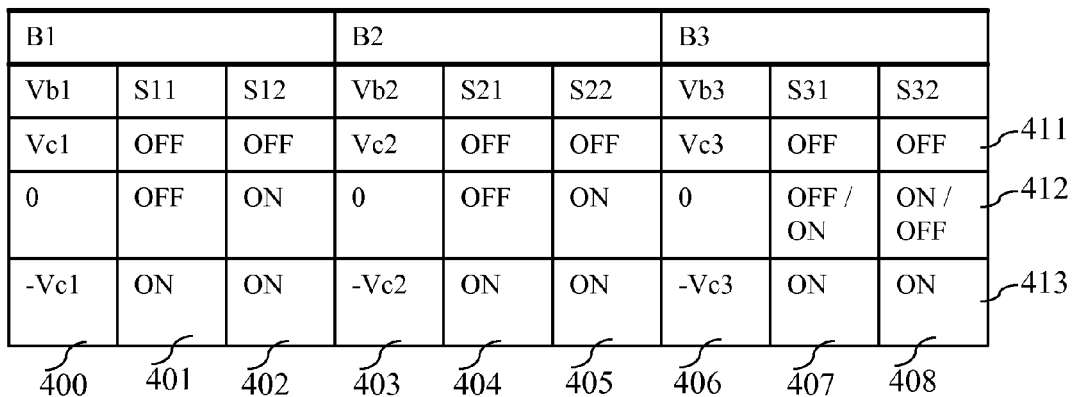
FIG. 4a represents a table representing the switching states of the switches of the first example of boost converter composed of three bridge devices in order to obtain different voltages on the bridges of the boost converter composed of three bridge devices.

FIG. 4a represents a table representing the switching states of the switches of the first example of boost converter composed of three bridge devices shown in FIG. 1a in order to obtain different voltages on bridges of the boost converter composed of three bridge devices.

The columns 400 to 402 are related to the bit B1, the columns 403 to 405 are related to the bit B2 and the columns 406 to 408 are related to the bit B3.

The line 411 shows that for a voltage Vb1 which is equal to Vc1, the switch S11 is in non conductive state and the switch S12 is in non conductive state, for a voltage Vb2 which is equal to Vc2, the switch S21 is in non conductive state and the switch S22 is in non conductive state, for a voltage Vb3 which is equal to Vc3, the switch S31 is in non conductive state and the switch S32 is in non conductive state.

The line 412 shows that for a voltage Vb1 which is equal to null value, the switch S11 is in non conductive state and the switch S12 is in conductive state, for a voltage Vb2 which is equal to null value, the switch S21 is in non conductive state and the switch S22 is in conductive state, for a voltage Vb3 which is equal to null value, the switch S31 is in conductive state when the switch S32 is in non conductive state or the switch S31 is in non conductive state when the switch S32 is in conductive state.

The line 413 shows that for a voltage Vb1 which is equal to −Vc1, the switch S11 is in conductive state and the switch S12 is in conductive state, for a voltage Vb2 which is equal to −Vc2, the switch S21 is in conductive state and the switch S22 is in conductive state, for a voltage Vb3 which is equal to −Vc3, the switch S31 is in conductive state and the switch S32 is in conductive state.

Figure 4B:
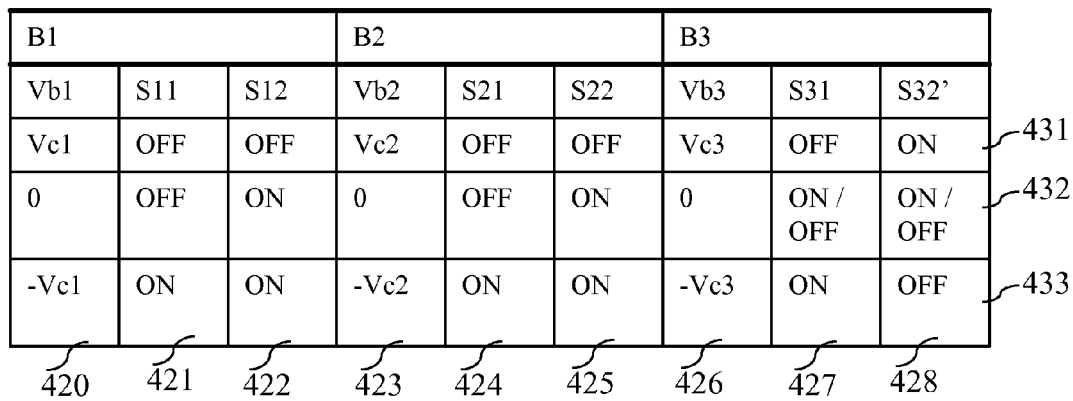
FIG. 4b represents a table representing the switching states of the switches of the second example of boost converter composed of three bridge devices in order to obtain different voltages on the bridges of the boost converter composed of three bridge devices.

FIG. 4b represents a table representing the switching states of the switches of the second example of boost converter composed of three bridge devices shown in FIG. 1b in order to obtain different voltages on bridges of the boost converter composed of three bridge devices.

The columns 420 to 422 are related to the bit B1, the columns 423 to 425 are related to the bit B2 and the columns 426 to 428 are related to the bit B3.

The line 431 shows that for a voltage Vb1 which is equal to Vc1, the switch S11 is in non conductive state and the switch S12 is in non conductive state, for a voltage Vb2 which is equal to Vc2, the switch S21 is in non conductive state and the switch S22 is in non conductive state, for a voltage Vb3 which is equal to Vc3, the switch S31 is in non conductive state and the switch S32' is in conductive state.

The line 432 shows that for a voltage Vb1 equal to null value, the switch S11 is in non conductive state and the switch S12 is in conductive state, for a voltage Vb2 which is equal to null value, the switch S21 is in non conductive state and the switch S22 is in conductive state and for a voltage Vb3 which is equal to null value, the switches S31 and S32' are together either in conductive state or in non conductive state.

The line 433 shows that for a voltage Vb1 which is equal to −Vc1, the switch S11 is in conductive state and the switch S12 is in conductive state, for a voltage Vb2 which is equal to −Vc2, the switch S21 is in conductive state and the switch S22 is in conductive state, for a voltage Vb3 which is equal to −Vc3, the switch S31 is in conductive state and the switch S32' is in non conductive state.

According to the invention, Vc1=Vref; Vc2=2Vref and Vc3=4Vref.

FIG. 4c represents a table representing the switching states of the switches of the third example of boost converter composed of four bridge devices in order to obtain different voltages on the bridges of the boost converter composed of four bridge devices.

The columns 450 to 452 are related to the bit B1, the columns 453 to 455 are related to the bit B2, the columns 456 to 458 are related to the bit B3 and the columns 459 to 461 are related to the bit B4.

The line 441 shows that for a voltage Vb1 which is equal to Vc1, the switch S11 is in non conductive state and the switch S12 is in non conductive state, for a voltage Vb2 which is equal to Vc2, the switch S21 is in non conductive state and the switch S22 is in non conductive state, for a voltage Vb3 which is equal to Vc3, the switch S31 is in non conductive state and the switch S32 is in non conductive state and for a voltage Vb4 which is equal to Vc4, the switch S41 is in non conductive state and the switch S42 is in non conductive state.

The line 442 shows that for a voltage Vb1 which is equal to null value, the switch S11 is in non conductive state and the switch S12 is in conductive state, for a voltage Vb2 which is equal to null value, the switch S21 is in non conductive state and the switch S22 is in conductive state, for a voltage Vb3 which is equal to null value, the switch S31 is in non conductive state and the switch S32 is in conductive state and for a voltage Vb4 which is equal to null value, the switch S41 is in non conductive state when the switch S42 is in conductive state or the switch S41 is in conductive state and the switch S42 is in non conductive state.

The line 443 shows that for a voltage Vb1 which is equal to −Vc1, the switch S11 is in conductive state and the switch S12 is in conductive state, for a voltage Vb2 which is equal to −Vc2, the switch S21 is in conductive state and the switch S22 is in conductive state, for a voltage Vb3 which is equal to −Vc3, the switch S31 is in conductive state and the switch S32 is in conductive state and for a voltage Vb4 which is equal to −Vc4, the switch S41 is in conductive state and the switch S42 is in conductive state.

FIG. 4d represents a table representing the switching states of the switches of the fourth example of boost converter composed of four bridge devices in order to obtain different voltages on the bridges of the boost converter composed of four bridge devices.

The columns 480 to 482 are related to the bit B1, the columns 483 to 485 are related to the bit B2, the columns 486 to 488 are related to the bit B3 and the columns 489 to 491 are related to the bit B4.

The line 471 shows that for a voltage Vb1 which is equal to Vc1, the switch S11 is in non conductive state and the switch S12 is in non conductive state, for a voltage Vb2 which is equal to Vc2, the switch S21 is in non conductive state and the switch S22 is in non conductive state, for a voltage Vb3 which is equal to Vc3, the switch S31 is in non conductive state and the switch S32 is in non conductive state and for a voltage Vb4 which is equal to Vc4, the switch S41 is in non conductive state and the switch S42' is in conductive state.

The line 472 shows that for a voltage Vb1 equal to null value, the switch S11 is in non conductive state and the switch S12 is in conductive state, for a voltage Vb2 which is equal to null value, the switch S21 is in non conductive state and the switch S22 is in conductive state, for a voltage Vb3 which is equal to null value, the switch S31 is in non conductive state and the switch S32 is in conductive state and for a voltage Vb4 which is equal to null value, the switch S41 is in conductive state when the switch S42' is in conductive state or the switch S41 is in non conductive state when the switch S42' is in non conductive state.

The line 473 shows that for a voltage Vb1 which is equal to −Vc1, the switch S11 is in conductive state and the switch S12 is in conductive state, for a voltage Vb2 which is equal to −Vc2, the switch S21 is in conductive state and the switch S22 is in conductive state, for a voltage Vb3 which is equal to −Vc3, the switch S31 is in conductive state and the switch S32 is in conductive state and for a voltage Vb4 which is equal to −Vc4, the switch S41 is in conductive state and the switch S42' is in non conductive state.

FIGS. 5a to 5h are examples of voltage values on the bridges of the boost converter composed of three bridges in order to have different step-up ratios when the periodical pattern is decomposed into eight time intervals. The reference voltage Vref equals Vout divided by eight.

In the lines 501, 511, 521, 531, 541, 551, 561 and 571 a value which is equal to 1 means that $Vb1=V_{ref}$, a value which is equal to −1 means $Vb1=-V_{ref}$ and a value which is equal to 0 means $Vb1=0$.

In the lines 502, 512, 522, 532, 542, 552, 562 and 572, a value which is equal to 1 means that $Vb2=2V_{ref}$, a value which is equal to −1 means $Vb2=-2V_{ref}$ and a value which is equal to 0 means $Vb2=0$.

In the lines 503, 513, 521, 533, 543, 553, 563 and 573, a value which is equal to 1 means that $Vb3=4V_{ref}$, a value which is equal to −1 means $Vb3=-4V_{ref}$ and a value which is equal to 0 means $Vb3=0$.

The duration of each time interval T1 to T8 is ΔT=T/N (N=8), where T is the duration of the cycle operated by switch S4 of the FIG. 1a or by switch S32' of FIG. 1b.

FIG. 5a comprises voltage values on the bridges of the RLBC in order to have a ratio Vout/Vin=N/(N−P)=8 (D=0.875).

Eight time intervals are needed in order to get a ratio Vout/Vin=8.

At time intervals T1, T2, T3 and T4, $Vb1=V_{ref}$, $Vb2=Vb3=0$. At time intervals T5 and T6, $Vb1=-V_{ref}$, $Vb2=2V_{ref}$ and $Vb3=0$. At time interval T7, $Vb1=-V_{ref}$, $Vb2=-2V_{ref}$ and $Vb3=4V_{ref}$. At time interval T8, $Vb1=-V_{ref}$, $Vb2=-2V_{ref}$ and $Vb3=-4V_{ref}$.

When the voltage values are the one of the bridges of the boost converter of FIG. 1a, the switch S4 is in conductive state during time intervals T1 to T7 (P=7) and in non conductive state at time interval T8 (N=8).

FIG. 5b comprises voltage values on the bridges of the RLBC in order to have a ratio Vout/Vin=4.

Eight time intervals are needed in order to get a ratio Vout/Vin=4.

At time intervals T1, T2, T3 and T4, $Vb2=2V_{ref}$, $Vb1=Vb3=0$. At time intervals T5 and T6, $Vb1=0$, $Vb2=-2V_{ref}$ and $Vb3=4V_{ref}$. At time intervals T7 and T8, $Vb1=0$, $Vb2=-2V_{ref}$ and $Vb3=-4V_{ref}$.

When the voltage values are the one of the bridges of the boost converter of FIG. 1a, the switch S4 is in conductive state during time intervals T1 to T6 and in non conductive state at time intervals T7 and T8.

FIG. 5c comprises voltage values on the bridges of the RLBC in order to have a ratio Vout/Vin=2.66.

Eight time intervals are needed in order to get a ratio Vout/Vin=2.66.

At time interval T1, $Vb1=-V_{ref}$, $Vb2=0$ and $Vb3=4V_{ref}$.

At time intervals T2 and T3, $Vb1=V_{ref}$, $Vb2=-2V_{ref}$ and $Vb3=4V_{ref}$. At time intervals T4 and T5, $Vb1=V_{ref}$, $Vb2=2V_{ref}$ and $Vb3=0$. At time intervals T6, T7 and T8, $Vb1=-V_{ref}$, $Vb2=0$ and $Vb3=-4V_{ref}$.

When the voltage values are the one of the bridges of the boost converter of FIG. 1a, the switch S4 is in conductive state during time intervals T1 to T5 and in non conductive state at time intervals T6 to T8.

FIG. 5d comprises voltage values on the bridges of the RLBC in order to have a ratio Vout/Vin=2.66.

Eight time intervals are needed in order to get a ratio Vout/Vin=2.66.

At time intervals T1 and T2, $Vb1=V_{ref}$, $Vb2=2V_{ref}$ and $Vb3=0$. At time intervals T3, T4 and T5, $Vb1=-V_{ref}$, $V2=0$ and $Vb3=4V_{ref}$. At time interval T6, $Vb1=-V_{ref}$, $Vb2=0$ and $Vb3=-4V_{ref}$. At time intervals T7 and T8, $Vb1=V_{ref}$, $Vb2=-2V_{ref}$ and $Vb3=-4V_{ref}$.

When the voltage values are the one of the bridges of the boost converter of FIG. 1a, the switch S4 is in conductive state during time intervals T1 to T5 and in non conductive state at time intervals T6 to T8.

FIG. 5e comprises voltage values on the bridges of the RLBC in order to have a ratio Vout/Vin=2.

Eight time intervals are needed in order to get a ratio Vout/Vin=2.

At time intervals T1, T2, T3 and T4, Vb1=Vb2=0 and Vb3=4$V_{ref}$. At time intervals T5, T6, T7 and T8, Vb1=Vb2=0 and Vb3=−4$V_{ref}$.

When the voltage values are the one of the bridges of the boost converter of FIG. 1a, the switch S4 is in conductive state during time intervals T1 to T4 and in non conductive state at time intervals T5 to T8.

FIG. 5f comprises voltage values on the bridges of the RLBC in order to have a ratio Vout/Vin=1.6.

Eight time intervals are needed in order to get a ratio Vout/Vin=1.6.

At time interval T1, Vb1=$V_{ref}$, Vb2=0 and Vb3=4$V_{ref}$. At time intervals T2 and T3, Vb1=−$V_{ref}$, Vb2=2$V_{ref}$ and Vb3=4$V_{ref}$. At time intervals T4 and T5, Vb1=−$V_{ref}$, Vb2=−2$V_{ref}$ and Vb3=0. At time intervals T6, T7 and T8, Vb1=$V_{ref}$, Vb2=0 and Vb3=−4$V_{ref}$.

When the voltage values are the one of the bridges of the boost converter of FIG. 1a, the switch S4 is in conductive state during time intervals T1 to T3 and in non conductive state at time intervals T4 to T8.

FIG. 5g comprises voltage values on the bridges of the RLBC in order to have a ratio Vout/Vin=1.33.

Eight time intervals are needed in order to get a ratio Vout/Vin=1.33.

At time intervals T1 and T2, Vb1=0, Vb2=2$V_{ref}$ and Vb3=4$V_{ref}$. At time intervals T3, T4, T5 and T6, Vb1=0, Vb2=−2$V_{ref}$ and Vb3=0. At time intervals T7 and T8, Vb1=0, Vb2=2$V_{ref}$ and Vb3=−4$V_{ref}$.

When the voltage values are the one of the bridges of the boost converter of FIG. 1a, the switch S4 is in conductive state during time intervals T1 to T2 and in non conductive state at time intervals T3 and T8.

FIG. 5h comprises voltage values on the bridges of the RLBC in order to have a ratio Vout/Vin=1.14.

Eight time intervals are needed in order to get a ratio Vout/Vin=1.14.

At time interval T1, Vb1=$V_{ref}$, Vb2=2$V_{ref}$ and Vb3=4$V_{ref}$. At time intervals T2, T3, T4 and T5, Vb1=−$V_{ref}$ and Vb2=Vb3=0. At time intervals T6 and T7, Vb1=$V_{ref}$, Vb2=−2$V_{ref}$ and Vb3=0. At time interval T8, Vb1=$V_{ref}$, Vb2=2$V_{ref}$ and Vb3=−4$V_{ref}$.

When the voltage values are the one of the bridges of the boost converter of FIG. 1a, the switch S4 is in conductive state during time interval T1 and in non conductive state at time intervals T2 to T8.

FIGS. 6a to 6f are examples of voltage values on the bridges of the boost converter composed of three bridges in order to have different step-up ratios when the periodical pattern is decomposed into seven time intervals. The reference voltage Vref equals Vout divided by seven.

In the lines 601, 611, 621, 631, 641 and 651 a value which is equal to 1 means that Vb1=$V_{ref}$, a value which is equal to −1 means Vb1=−$V_{ref}$ and a value which is equal to 0 means Vb1=0.

In the lines 602, 612, 622, 632, 642 and 652, a value which is equal to 1 means that Vb2=2$V_{ref}$, a value which is equal to −1 means Vb2=−2$V_{ref}$ and a value which is equal to 0 means Vb2=0.

In the lines 603, 613, 623, 633, 643 and 653, a value which is equal to 1 means that Vb3=4$V_{ref}$, a value which is equal to −1 means Vb3=−4$V_{ref}$ and a value which is equal to 0 means Vb3=0.

The duration of each time interval T1 to T7 is ΔT=T/N (N=7), where T is the duration of the cycle operated by switch S4 of the FIG. 1a or by switch S32' of FIG. 1b.

FIG. 6a comprises voltage values on the bridges of the RLBC in order to have a ratio Vout/Vin=7.

Seven time intervals are needed in order to get a ratio Vout/Vin=7.

At time intervals T1, T2 and T3 Vb1=$V_{ref}$, Vb2=V3b=0. At time intervals T4 and T5, Vb1=−$V_{ref}$, Vb2=2$V_{ref}$ and Vb3=0. At time interval T6, Vb1=−$V_{ref}$, Vb2=−2$V_{ref}$ and Vb3=4$V_{ref}$. At time interval T7, Vb1=0, Vb2=−2$V_{ref}$ and Vb3=−4$V_{ref}$.

When the voltage values are the one of the bridges of the boost converter of FIG. 1a, the switch S4 is in conductive state during time intervals T1 to T6 and in non conductive state at time interval T7.

FIG. 6b comprises voltage values on the bridges of the RLBC in order to have a ratio Vout/Vin=3.5.

Seven time intervals are needed in order to get a ratio Vout/Vin=3.5.

At time intervals T1, T2 and T3 Vb1=0, Vb2=2$V_{ref}$ and Vb3=0. At time intervals T4 and T5, Vb1=0, Vb2=−2$V_{ref}$ and Vb3=4$V_{ref}$. At time interval T6, Vb1=$V_{ref}$, Vb2=−2$V_{ref}$ and Vb3=−4$V_{ref}$. At time interval T7, Vb1=−$V_{ref}$, Vb2=0 and Vb3=−4$V_{ref}$.

When the voltage values are the one of the bridges of the boost converter of FIG. 1a, the switch S4 is in conductive state during time intervals T1 to T5 and in non conductive state at time intervals T6 and T7.

FIG. 6c comprises voltage values on the bridges of the RLBC in order to have a ratio Vout/Vin=2.33.

Seven time intervals are needed in order to get a ratio Vout/Vin=2.33.

At time intervals T1 and T2 Vb1=−$V_{ref}$, Vb2=0 and Vb3=4$V_{ref}$. At time interval T3, Vb1=$V_{ref}$, Vb2=−2$V_{ref}$ and Vb3=4$V_{ref}$. At time interval T4, Vb1=$V_{ref}$, Vb2=2$V_{ref}$ and Vb3=0. At time intervals T5, T6 and T7, Vb1=0, Vb2=0 and Vb3=−4$V_{ref}$.

When the voltage values are the one of the bridges of the boost converter of FIG. 1a, the switch S4 is in conductive state during time intervals T1 to T4 and in non conductive state at time intervals T5 to T7.

FIG. 6d comprises voltage values on the bridges of the RLBC in order to have a ratio Vout/Vin=1.75.

Seven time intervals are needed in order to get a ratio Vout/Vin=1.75.

At time intervals T1, T2 and T3 Vb1=0, Vb2=0 and Vb3=4$V_{ref}$. At time intervals T4 and T5, Vb1=$V_{ref}$, Vb2=0 and Vb3=−4$V_{ref}$. At time interval T6, Vb1=−$V_{ref}$, Vb2=−2$V_{ref}$ and Vb3=0. At time interval T7, Vb1=−$V_{ref}$, Vb2=2$V_{ref}$ and Vb3=−4$V_{ref}$.

When the voltage values are the one of the bridges of the boost converter of FIG. 1a, the switch S4 is in conductive state during time intervals T1 to T3 and in non conductive state at time intervals T4 to T7.

FIG. 6e comprises voltage values on the bridges of the RLBC in order to have a ratio Vout/Vin=1.4.

Seven time intervals are needed in order to get a ratio Vout/Vin=1.4.

At time interval T1, Vb1=$V_{ref}$, Vb2=0 and Vb3=4$V_{ref}$. At time interval T2, Vb1=−$V_{ref}$, Vb2=2$V_{ref}$ and Vb3=4$V_{ref}$. At time intervals T3 and T4 Vb1=0, Vb2=2$V_{ref}$ and Vb3=−4$V_{ref}$. At time intervals T5, T6 and T7, Vb1=0, Vb2=−2$V_{ref}$ and Vb3=0.

When the voltage values are the one of the bridges of the boost converter of FIG. 1a, the switch S4 is in conductive state during time intervals T1 and T2 and in non conductive state at time intervals T3 to T7.

FIG. 6f comprises voltage values on the bridges of the RLBC in order to have a ratio Vout/Vin=1.16.

Seven time intervals are needed in order to get a ratio Vout/Vin=1.16.

At time interval T1, Vb1=0, Vb2=2V$_{ref}$ and Vb3=4V$_{ref}$. At time intervals T2, T3 and T4, Vb1=-V$_{ref}$, Vb2=0 and Vb3=0. At time intervals T5 and T6 Vb1=V$_{ref}$, Vb2=-2V$_{ref}$ and Vb3=0. At time interval T7, Vb1=V$_{ref}$, Vb2=2V$_{ref}$ and Vb3=-4V$_{ref}$.

When the voltage values are the one of the bridges of the boost converter of FIG. 1a, the switch S4 is in conductive state during time interval T1 and in non conductive state at time intervals T2 to T7.

FIGS. 7a and 7b are examples of voltage values on the bridges of the boost converter composed of three bridges in order to have different step-up ratios when the periodical pattern is decomposed into ten time intervals. The reference voltage Vref equals Vout divided by ten.

In the lines 701 and 711, a value which is equal to 1 means that Vb1=V$_{ref}$, a value which is equal to -1 means Vb1=-V$_{ref}$ and a value which is equal to 0 means Vb1=0.

In the lines 702 and 712, a value which is equal to 1 means that Vb2=2V$_{ref}$, a value which is equal to -1 means Vb2=-2V$_{ref}$ and a value which is equal to 0 means Vb2=0.

In the lines 703 and 713, a value which is equal to 1 means that Vb3=4V$_{ref}$, a value which is equal to -1 means Vb3=-4V$_{ref}$ and a value which is equal to 0 means Vb3=0.

The duration of each time interval T1 to T10 is ΔT=T/N (N=10), where T is the duration of the cycle operated by switch S4 of the FIG. 1a or by switch S32' of FIG. 1b.

FIG. 7a comprises voltage values on the bridges of the RLBC in order to have a ratio Vout/Vin=3.33.

Ten time intervals are needed in order to get a ratio Vout/Vin=3.33.

At time intervals T1, T2, T3 and T4 Vb1=V$_{ref}$, Vb2=2V$_{ref}$ and Vb3=0. At time interval T5, Vb1=V$_{ref}$, Vb2=-2V$_{ref}$ and Vb3=4V$_{ref}$. At time intervals T6 and T7, Vb1=-V$_{ref}$, Vb2=0 and Vb3=4V$_{ref}$. At time intervals T8, T9 and T10, Vb1=-V$_{ref}$, Vb2=-2V$_{ref}$ and Vb3=-4V$_{ref}$.

When the voltage values are the one of the bridges of the boost converter of FIG. 1a, the switch S4 is in conductive state during time intervals T1 to T7 and in non conductive state at time intervals T8 to 10 T1.

FIG. 7b comprises voltage values on the bridges of the RLBC in order to have a ratio Vout/Vin=1.42.

Ten time intervals are needed in order to get a ratio Vout/Vin=1.42.

At time intervals T1, T2 and T3 Vb1=V$_{ref}$, Vb2=2V$_{ref}$ and Vb3=4V$_{ref}$. At time intervals T4, T5, T6 and T7, Vb1=-V$_{ref}$, Vb2=-2V$_{ref}$ and Vb3=0. At time interval T8, Vb1=-V$_{ref}$, Vb2=2V$_{ref}$ and Vb3=-4V$_{ref}$. At time intervals T9 and T10, Vb1=V$_{ref}$, Vb2=0 and Vb3=-4V$_{ref}$.

When the voltage values are the one of the bridges of the boost converter of FIG. 1a, the switch S4 is in conductive state during time intervals T1 to T3 and in non conductive state at time intervals T7 to 10 T1.

FIGS. 8a to 8c are examples of voltage values on the bridges of the boost converter composed of three bridges in order to have different step-up ratios when the periodical pattern is decomposed into six time intervals. The reference voltage Vref equals Vout divided by six.

In the lines 801, 811 and 821, a value which is equal to 1 means that Vb1=V$_{ref}$, a value which is equal to -1 means Vb1=-V$_{ref}$ and a value which is equal to 0 means Vb1=0.

In the lines 802, 812 and 822, a value which is equal to 1 means that Vb2=2V$_{ref}$, a value which is equal to -1 means Vb2=-2V$_{ref}$ and a value which is equal to 0 means Vb2=0.

In the lines 803, 813 and 823, a value which is equal to 1 means that Vb3=4V$_{ref}$, a value which is equal to -1 means Vb3=-4V$_{ref}$ and a value which is equal to 0 means Vb3=0.

The duration of each time interval T1 to T6 is ΔT=T/N (N=6), where T is the duration of the cycle operated by switch S4 of the FIG. 1a or by switch S32' of FIG. 1b.

FIG. 8a comprises voltage values on the bridges of the RLBC in order to have a ratio Vout/Vin=0.833.

Six time intervals are needed in order to get a ratio Vout/Vin=0.833.

At time interval T1, Vb1=V$_{ref}$, Vb2=0 and Vb3=0. At time intervals T2 and T3, Vb1=V$_{ref}$, Vb2=0 and Vb3=0. At time interval T4, Vb1=-V$_{ref}$, Vb2=-2V$_{ref}$ and Vb3=0. At time interval T5, Vb1=-V$_{ref}$, Vb2=-2V$_{ref}$ and Vb3=4V$_{ref}$. At time interval T6, Vb1=-V$_{ref}$, Vb2=0 and Vb3=-4V$_{ref}$.

When the voltage values are the one of the bridges of the boost converter of FIG. 1a, the switch S4 is in conductive state during time intervals T1 to T5 and in non conductive state at time interval T6.

FIG. 8b comprises voltage values on the bridges of the RLBC in order to have a ratio Vout/Vin=0.166.

Six time intervals are needed in order to get a ratio Vout/Vin=0.166.

At time interval T1, Vb1=V$_{ref}$, Vb2=0 and Vb3=4V$_{ref}$. At time interval T2, Vb1=V$_{ref}$, Vb2=2V$_{ref}$ and Vb3=-4V$_{ref}$. At time interval T3, Vb1=V$_{ref}$, Vb2=-2V$_{ref}$ and Vb3=0. At time intervals T4, T5 and T6, Vb1=-V$_{ref}$, Vb2=0 and Vb3=0.

When the voltage values are the one of the bridges of the boost converter of FIG. 1a, the switch S4 is in conductive state during time interval T1 and in non conductive state at time intervals T2 to T6.

FIG. 8c comprises voltage values on the bridges of the RLBC in order to have a ratio Vout/Vin=0.166.

Six time intervals are needed in order to get a ratio Vout/Vin=0.166.

At time interval T1, Vb1=-V$_{ref}$, Vb2=2V$_{ref}$ and Vb3=4V$_{ref}$. At time interval T2, Vb1=V$_{ref}$, Vb2=2V$_{ref}$ and Vb3=-4V$_{ref}$. At time interval T3, Vb1=V$_{ref}$, Vb2=-2V$_{ref}$ and Vb3=0. At time interval T4, Vb1=V$_{ref}$, Vb2=-2V$_{ref}$ and Vb3=0. At time intervals T5 and T6, Vb1=-V$_{ref}$, Vb2=0 and Vb3=0.

When the voltage values are the one of the bridges of the boost converter of FIG. 1a, the switch S4 is in conductive state during time interval T1 and in non conductive state at time intervals T2 to T6.

FIGS. 9a to 9d are examples of voltage values on the bridges of the boost converter composed of three bridges in order to have different step-up ratios when the periodical pattern is decomposed into five time intervals. The reference voltage Vref equals Vout divided by five.

In the lines 901, 911, 921 and 931, a value which is equal to 1 means that Vb1=V$_{ref}$, a value which is equal to -1 means Vb1=-V$_{ref}$ and a value which is equal to 0 means Vb1=0.

In the lines 902, 912, 922 and 932, a value which is equal to 1 means that Vb2=2V$_{ref}$, a value which is equal to -1 means Vb2=-2V$_{ref}$ and a value which is equal to 0 means Vb2=0.

In the lines 903, 913, 923 and 933, a value which is equal to 1 means that Vb3=4V$_{ref}$, a value which is equal to -1 means Vb3=-4V$_{ref}$ and a value which is equal to 0 means Vb3=0.

The duration of each time interval T1 to T5 is ΔT=T/N (N=5), where T is the duration of the cycle operated by switch S4 of the FIG. 1a or by switch S32' of FIG. 1b.

FIG. 9a comprises voltage values on the bridges of the RLBC in order to have a ratio Vout/Vin=0.8.

Five time intervals are needed in order to get a ratio Vout/Vin=0.8.

At time interval T1, Vb1=−$V_{ref}$, Vb2=−2$V_{ref}$ and Vb3=4$V_{ref}$. At time interval T2, Vb1=−$V_{ref}$, Vb2=2$V_{ref}$ and Vb3=0. At time intervals T3 and T4, Vb1=$V_{ref}$, Vb2=0 and Vb3=0. At time interval T5, Vb1=0, Vb2=0 and Vb3=−4$V_{ref}$.

When the voltage values are the one of the bridges of the boost converter of FIG. 1a, the switch S4 is in conductive state during time intervals T1 to T4 and in non conductive state at time interval T5.

FIG. 9b comprises voltage values on the bridges of the RLBC in order to have a ratio Vout/Vin=0.6.

Five time intervals are needed in order to get a ratio Vout/Vin=0.6.

At time interval T1, Vb1=0, Vb2=−2$V_{ref}$ and Vb3=4$V_{ref}$. At time interval T2, Vb1=0, Vb2=2$V_{ref}$ and Vb3=0. At time interval T3, Vb1=0, Vb2=2$V_{ref}$ and Vb3=0. At time interval T4, Vb1=−$V_{ref}$, Vb2=−2$V_{ref}$ and Vb3=0. At time interval T5, Vb1=$V_{ref}$, Vb2=0 and Vb3=−4$V_{ref}$.

When the voltage values are the one of the bridges of the boost converter of FIG. 1a, the switch S4 is in conductive state during time intervals T1 to T3 and in non conductive state at time intervals T4 and T5.

FIG. 9c comprises voltage values on the bridges of the RLBC in order to have a ratio Vout/Vin=0.4.

Five time intervals are needed in order to get a ratio Vout/Vin=0.4.

At time interval T1, Vb1=$V_{ref}$, Vb2=2$V_{ref}$ and Vb3=0. At time interval T2, Vb1=−$V_{ref}$, Vb2=0 and Vb3=4$V_{ref}$. At time interval T3, Vb1=0, Vb2=2$V_{ref}$ and Vb3=−4$V_{ref}$. At time interval T4, Vb1=0, Vb2=−2$V_{ref}$ and Vb3=0. At time interval T5, Vb1=0, Vb2=−2$V_{ref}$ and Vb3=0.

When the voltage values are the one of the bridges of the boost converter of FIG. 1a, the switch S4 is in conductive state during time intervals T1 and T2 and in non conductive state at time intervals T3 to T5.

FIG. 9d comprises voltage values on the bridges of the RLBC in order to have a ratio Vout/Vin=0.2.

Five time intervals are needed in order to get a ratio Vout/Vin=0.2.

At time interval T1, Vb1=0, Vb2=0 and Vb3=4$V_{ref}$. At time interval T2, Vb1=$V_{ref}$, Vb2=2$V_{ref}$ and Vb3=−4$V_{ref}$. At time interval T3, Vb1=$V_{ref}$, Vb2=−2$V_{ref}$ and Vb3=0. At time intervals T4 and T5, Vb1=−$V_{ref}$, Vb2=0 and Vb3=0.

When the voltage values are the one of the bridges of the boost converter of FIG. 1a, the switch S4 is in conductive state during time interval T1 and in non conductive state at time intervals T2 to T5.

FIGS. 10a and 10b are examples of voltage values on the bridges of the boost converter composed of four bridges in order to have different step-up ratios when the periodical pattern is decomposed into ten time intervals.

In the lines 1001 and 1011 a value which is equal to 1 means that Vb1=$V_{ref}$, a value which is equal to −1 means Vb1=−$V_{ref}$ and a value which is equal to 0 means Vb1=0.

In the lines 1002 and 1012 a value which is equal to 1 means that Vb2=$V_{ref}$, a value which is equal to −1 means Vb2=−$V_{ref}$ and a value which is equal to 0 means Vb2=0.

In the lines 1003 and 1013 a value which is equal to 1 means that Vb3=$V_{ref}$, a value which is equal to −1 means Vb3=−$V_{ref}$ and a value which is equal to 0 means Vb3=0.

In the lines 1004 and 1014 a value which is equal to 1 means that Vb4=4$V_{ref}$, a value which is equal to −1 means Vb4=−4$V_{ref}$ and a value which is equal to 0 means Vb3=0.

The duration of each time interval T1 to T10 is ΔT=T/N (N=10), where T is the duration of the cycle operated by switch S4 of the FIG. 1c or by switch S42' of FIG. 1d.

FIG. 10a comprises voltage values on the bridges of the RLBC in order to have a ratio Vout/Vin=N/(N−P)=6 (D=0.7).

Ten time intervals are needed in order to get a ratio Vout/Vin=6.

At time intervals T1, T2, T3 and T4, Vb1=$V_{ref}$, Vb2=$V_{ref}$, Vb3=$V_{ref}$ and Vb4=0. At time interval T5, Vb1=−$V_{ref}$, Vb2=0, Vb3=0 and Vb4=4$V_{ref}$. At time interval T6, Vb1=0, Vb2=−$V_{ref}$, Vb3=0 and Vb4=4$V_{ref}$. At time interval T7, Vb1=0, Vb2=0, Vb3=−$V_{ref}$ and Vb4=4$V_{ref}$. At time intervals T8, T9 and T10, Vb1=−$V_{ref}$, Vb2=−$V_{ref}$, Vb3=−$V_{ref}$ and Vb4=−4$V_{ref}$.

When the voltage values are the one of the bridges of the boost converter of FIG. 1c, the switch S4 is in conductive state during time intervals T1 to T7 (P=7) and in non conductive state at time intervals T8 to T10 (N=10).

FIG. 10b comprises voltage values on the bridges of the RLBC in order to have a ratio Vout/Vin=N/(N−P)=4 (D=0.3).

Ten time intervals are needed in order to get a ratio Vout/Vin=4.

At time intervals T1, T2 and T3, Vb1=$V_{ref}$, Vb2=$V_{ref}$, Vb3=$V_{ref}$ and Vb4=4$V_{ref}$. At time interval T4, Vb1=0, Vb2=0, Vb3=$V_{ref}$ and Vb4=−4$V_{ref}$. At time interval T5, Vb1=0, Vb2=$V_{ref}$, Vb3=0 and Vb4=−4$V_{ref}$. At time interval T6, Vb1=$V_{ref}$, Vb2=0, Vb3=0 and Vb4=−4$V_{ref}$. At time intervals T7, T8, T9 and T10, Vb1=−$V_{ref}$, Vb2=−$V_{ref}$, Vb3=−$V_{ref}$ and Vb4=0.

When the voltage values are the one of the bridges of the boost converter of FIG. 1c, the switch S4 is in conductive state during time intervals T1 to T3 (P=3) and in non conductive state at time intervals T4 to T10 (N=10).

FIGS. 11a to 11d are examples of voltage values on the bridges of the boost converter composed of four bridges in order to have different step-up ratios when the periodical pattern is decomposed into nine time intervals.

In the lines 1101, 1111, 1121 and 1131 a value which is equal to 1 means that Vb1=$V_{ref}$, a value which is equal to −1 means Vb1=−$V_{ref}$ and a value which is equal to 0 means Vb1=0.

In the lines 1102, 1112, 1122 and 1132 a value which is equal to 1 means that Vb2=$V_{ref}$, a value which is equal to −1 means Vb2=−$V_{ref}$ and a value which is equal to 0 means Vb2=0.

In the lines 1103, 1113, 1123 and 1133 a value which is equal to 1 means that Vb3=$V_{ref}$, a value which is equal to −1 means Vb3=−$V_{ref}$ and a value which is equal to 0 means Vb3=0.

In the lines 1104, 1114, 1124 and 1134 a value which is equal to 1 means that Vb4=4$V_{ref}$, a value which is equal to −1 means Vb4=−4$V_{ref}$ and a value which is equal to 0 means Vb3=0.

The duration of each time interval T1 to T9 is ΔT=T/N (N=9), where T is the duration of the cycle operated by switch S4 of the FIG. 1c or by switch S42' of FIG. 1d.

FIG. 11a comprises voltage values on the bridges of the RLBC in order to have a ratio Vout/Vin=N/(N−P)=4.5 (D=0.777).

Nine time intervals are needed in order to get a ratio Vout/Vin=4.5.

At time intervals T1, T2 and T3, Vb1=$V_{ref}$, Vb2=$V_{ref}$, Vb3=0 and Vb4=0. At time interval T4, Vb1=$V_{ref}$, Vb2=0, Vb3=$V_{ref}$ and Vb4=0. At time interval T5, Vb1=0, Vb2=$V_{ref}$, Vb3=$V_{ref}$ and Vb4=0. At time intervals T6 and T7, Vb1=−$V_{ref}$, Vb2=−$V_{ref}$, Vb3=0 and Vb4=4$V_{ref}$. At time intervals T8 and T9, Vb1=−$V_{ref}$, Vb2=−$V_{ref}$, Vb3=−$V_{ref}$ and Vb4=−4$V_{ref}$.

When the voltage values are the one of the bridges of the boost converter of FIG. 1c, the switch S4 is in conductive state during time intervals T1 to T7 (P=7) and in non conductive state at time intervals T8 and T9 (N=9).

FIG. 11b comprises voltage values on the bridges of the RLBC in order to have a ratio Vout/Vin=N/(N−P)=3 (D=0.666).

Nine time intervals are needed in order to get a ratio Vout/Vin=3.

At time intervals T1, T2 and T3, Vb1=$V_{ref}$, Vb2=$V_{ref}$, Vb3=$V_{ref}$ and Vb4=0. At time interval T4, Vb1=$V_{ref}$, Vb2=−$V_{ref}$, Vb3=−$V_{ref}$ and Vb4=4$V_{ref}$. At time interval T5, Vb1=−$V_{ref}$, Vb2=$V_{ref}$, Vb3=−$V_{ref}$ and Vb4=4$V_{ref}$. At time interval T6, Vb1=−$V_{ref}$, Vb2=−$V_{ref}$, Vb3=−$V_{ref}$ and Vb4=4$V_{ref}$. At time interval T7, Vb1=−$V_{ref}$, Vb2=−$V_{ref}$, Vb3=0 and Vb4=−4$V_{ref}$. At time interval T8, Vb1=−$V_{ref}$, Vb2=0, Vb3=−$V_{ref}$ and Vb4=−4$V_{ref}$. At time interval T9, Vb1=0, Vb2=−$V_{ref}$, Vb3=−$V_{ref}$ and Vb4=−4$V_{ref}$.

When the voltage values are the one of the bridges of the boost converter of FIG. 1c, the switch S4 is in conductive state during time intervals T1 to T6 (P=6) and in non conductive state at time intervals T7 to T9 (N=9).

FIG. 11c comprises voltage values on the bridges of the RLBC in order to have a ratio Vout/Vin=N/(N−P)=1.5 (D=0.333).

Nine time intervals are needed in order to get a ratio Vout/Vin=1.5.

At time interval T1, Vb1=0, Vb2=$V_{ref}$, Vb3=$V_{ref}$ and Vb4=4$V_{ref}$. At time interval T2, Vb1=$V_{ref}$, Vb2=0, Vb3=$V_{ref}$ and Vb4=4$V_{ref}$. At time interval T3, Vb1=$V_{ref}$, Vb2=$V_{ref}$, Vb3=0 and Vb4=4$V_{ref}$. At time interval T4, Vb1=−$V_{ref}$, Vb2=$V_{ref}$, Vb3=$V_{ref}$ and Vb4=−4$V_{ref}$. At time interval T5, Vb1=$V_{ref}$, Vb2=−$V_{ref}$, Vb3=−$_{ref}$ and Vb4=−4$V_{ref}$. At time interval T6, Vb1=$V_{ref}$, Vb2=$V_{ref}$, Vb3=−$V_{ref}$ and Vb4=−4$V_{ref}$. At time intervals T7, T8 and T9, Vb1=−$V_{ref}$, Vb2=−$V_{ref}$, Vb3=−$V_{ref}$ and Vb4=0.

When the voltage values are the one of the bridges of the boost converter of FIG. 1c, the switch S4 is in conductive state during time intervals T1 to T3 (P=3) and in non conductive state at time intervals T4 to T9 (N=9).

FIG. 11d comprises voltage values on the bridges of the RLBC in order to have a ratio Vout/Vin=N/(N−P)=1.29 (D=0.222).

Nine time intervals are needed in order to get a ratio Vout/Vin=1.29.

At time intervals T1 and T2 and T3 Vb1=$V_{ref}$, Vb2=$V_{ref}$, Vb3=$V_{ref}$ and Vb4=4$V_{ref}$. At time intervals T3 and T4, Vb1=$V_{ref}$, Vb2=$V_{ref}$, Vb3=0 and Vb4=−4$V_{ref}$. At time interval T5, Vb1=0, Vb2=−$V_{ref}$, Vb3=−$V_{ref}$ and Vb4=4$V_{ref}$. At time interval T6, Vb1=−$V_{ref}$, Vb2=0, Vb3=−$V_{ref}$ and Vb4=0. At time intervals T7, T8 and T9, Vb1=−$V_{ref}$, Vb2=−$V_{ref}$, Vb3=0 and Vb4=0.

When the voltage values are the one of the bridges of the boost converter of FIG. 1c, the switch S4 is in conductive state during time intervals T1 and T2 (P=2) and in non conductive state at time intervals T3 to T9 (N=9).

FIGS. 12a to 12g are examples of voltage values on the bridges of the boost converter composed of four bridges in order to have different step-up ratios when the periodical pattern is decomposed into eight time intervals.

In the lines 1201, 1211, 1221, 1231, 1241, 1251 and 1261 a value which is equal to 1 means that Vb1=$V_{ref}$, a value which is equal to −1 means Vb1=−$V_{ref}$ and a value which is equal to 0 means Vb1=0.

In the lines 1202, 1212, 1222, 1232, 1242, 1252 and 1262 a value which is equal to 1 means that Vb2=$V_{ref}$, a value which is equal to −1 means Vb2=−$V_{ref}$ and a value which is equal to 0 means Vb2=0.

In the lines 1203, 1213, 1223, 1233, 1243, 1253 and 1263 a value which is equal to 1 means that Vb3=$V_{ref}$, a value which is equal to −1 means Vb3=−$V_{ref}$ and a value which is equal to 0 means Vb3=0.

In the lines 1204, 1214, 1224, 1234, 1244, 1254 and 1264 a value which is equal to 1 means that Vb4=4$V_{ref}$, a value which is equal to −1 means Vb4=−4$V_{ref}$ and a value which is equal to 0 means Vb3=0.

The duration of each time interval T1 to T8 is ΔT=T/N (N=8), where T is the duration of the cycle operated by switch S4 of the FIG. 1c or by switch S42' of FIG. 1d.

FIG. 12a comprises voltage values on the bridges of the RLBC in order to have a ratio Vout/Vin=N/(N−P)=8 (D=0.875).

Eight time intervals are needed in order to get a ratio Vout/Vin=8.

At time interval T1, Vb1=$V_{ref}$, Vb2=$V_{ref}$, Vb3=−$V_{ref}$ and Vb4=0. At time interval T2, Vb1=$V_{ref}$, Vb2=0, Vb3=0 and Vb4=0. At time interval T3, Vb1=$V_{ref}$, Vb2=−$V_{ref}$, Vb3=$V_{ref}$ and Vb4=0. At time interval T4, Vb1=0, Vb2=$V_{ref}$, Vb3=0 and Vb4=0. At time interval T5, Vb1=0, Vb2=0, Vb3=$V_{ref}$ and Vb4=0. At time interval T6, Vb1=−$V_{ref}$, Vb2=$V_{ref}$, Vb3=$V_{ref}$ and Vb4=0. At time interval T7, Vb1=−$V_{ref}$, Vb2=−$V_{ref}$, Vb3=−$V_{ref}$ and Vb4=4$V_{ref}$. At time interval T8, Vb1=−$V_{ref}$, Vb2=−$V_{ref}$, Vb3=−$V_{ref}$ and Vb4=−$V_{ref}$.

When the voltage values are the one of the bridges of the boost converter of FIG. 1c, the switch S4 is in conductive state during time intervals T1 to T7 (P=7) and in non conductive state at time interval T8 (N=8).

FIG. 12b comprises voltage values on the bridges of the RLBC in order to have a ratio Vout/Vin=N/(N−P)=4 (D=0.75).

Eight time intervals are needed in order to get a ratio Vout/Vin=4.

At time interval T1, Vb1=$V_{ref}$, Vb2=$V_{ref}$, Vb3=0 and Vb4=0. At time interval T2, Vb1=$V_{ref}$, Vb2=0, Vb3=$V_{ref}$ and Vb4=0. At time interval T3, Vb1=0, Vb2=$V_{ref}$, Vb3=$V_{ref}$ and Vb4=0. At time interval T4, Vb1=0, Vb2=−$V_{ref}$, Vb3=−$V_{ref}$ and Vb4=4$V_{ref}$. At time interval T5, Vb1=$V_{ref}$, Vb2=$V_{ref}$, Vb3=0 and Vb4=0. At time interval T6, Vb1=−$V_{ref}$, Vb2=−$V_{ref}$, Vb3=0 and Vb4=4$V_{ref}$. At time interval T7, Vb1=−$V_{ref}$, Vb2=0, Vb3=−$V_{ref}$ and Vb4=−4$V_{ref}$. At time interval T8, Vb1=−$V_{ref}$, Vb2=−$V_{ref}$, Vb3=0 and Vb4=−4$V_{ref}$.

When the voltage values are the one of the bridges of the boost converter of FIG. 1c, the switch S4 is in conductive state during time intervals T1 to T6 (P=6) and in non conductive state at time intervals T7 and T8 (N=8).

FIG. 12c comprises voltage values on the bridges of the RLBC in order to have a ratio Vout/Vin=N/(N−P)=2.67 (D=0.625).

Eight time intervals are needed in order to get a ratio Vout/Vin=2.67.

At time intervals T1 and T2, Vb1=$V_{ref}$, Vb2=$V_{ref}$, Vb3=$V_{ref}$ and Vb4=0. At time interval T3, Vb1=−$V_{ref}$, Vb2=$V_{ref}$, Vb3=−$V_{ref}$ and Vb4=4$V_{ref}$. At time interval T4, Vb1=$V_{ref}$, Vb2=−$V_{ref}$, Vb3=$V_{ref}$ and Vb4=4$V_{ref}$. At time interval T5, Vb1=−$V_{ref}$, Vb2=−$V_{ref}$, Vb3=$V_{ref}$ and Vb4=4$V_{ref}$. At time interval T6, Vb1=0, Vb2=0 Vb3=−$V_{ref}$ and Vb4=−4$V_{ref}$. At time interval T7, Vb1=0, Vb2=0, Vb3=−$V_{ref}$ and Vb4=−4$V_{ref}$. At time interval T8, Vb1=−$V_{ref}$, Vb2=0, Vb3=0 and Vb4=−4$V_{ref}$.

When the voltage values are the one of the bridges of the boost converter of FIG. 1c, the switch S4 is in conductive state during time intervals T1 to T5 (P=5) and in non conductive state at time intervals T6 to T8 (N=8).

FIG. 12d comprises voltage values on the bridges of the RLBC in order to have a ratio Vout/Vin=N/(N−P)=2 (D=0.5).

Eight time intervals are needed in order to get a ratio Vout/Vin=2.

At time intervals T1 to T4, Vb1=0, Vb2=0, Vb3=0 and Vb4=4V$_{ref}$. At time intervals T5 to T8, Vb1=0, Vb2=0, Vb3=0 and Vb4=-4V$_{ref}$.

When the voltage values are the one of the bridges of the boost converter of FIG. 1c, the switch S4 is in conductive state during time intervals T1 to T4 (P=4) and in non conductive state at time intervals T5 to T8 (N=8).

The matrix is of rank 1, equal to the number of capacitor bits effectively being used (only capacitor C4 is being charged and discharged according to switching pattern described by FIG. 12d).

FIG. 12e comprises voltage values on the bridges of the RLBC in order to have a ratio Vout/Vin=N/(N−P)=1.6 (D=0.375).

Eight time intervals are needed in order to get a ratio Vout/Vin=1.6.

At time interval T1, Vb1=V$_{ref}$, Vb2=0, Vb3=0 and Vb4=4V$_{ref}$. At time interval T2, Vb1=0, Vb2=V$_{ref}$, Vb3=0 and Vb4=4V$_{ref}$. At time interval T3, Vb1=0, Vb2=0, Vb3=V$_{ref}$ and Vb4=4V$_{ref}$. At time interval T4, Vb1=V$_{ref}$, Vb2=V$_{ref}$, Vb3=-V$_{ref}$ and Vb4=-4V$_{ref}$ At time interval T5, Vb1=-V$_{ref}$, Vb2=V$_{ref}$, Vb3=V$_{ref}$ and Vb4=-4V$_{ref}$. At time interval T6, Vb1=V$_{ref}$, Vb2=-V$_{ref}$, Vb3=V$_{ref}$ and Vb4= -4V$_{ref}$. At time intervals T7 and T8, Vb1=-V$_{ref}$, Vb2=-V$_{ref}$, Vb3=-V$_{ref}$ and Vb4=0.

When the voltage values are the one of the bridges of the boost converter of FIG. 1c, the switch S4 is in conductive state during time intervals T1 to T3 (P=3) and in non conductive state at time intervals T4 to T8 (N=8).

FIG. 12f comprises voltage values on the bridges of the RLBC in order to have a ratio Vout/Vin=N/(N−P)=1.33 (D=0.25).

Eight time intervals are needed in order to get a ratio Vout/Vin=1.33.

At time interval T1, Vb1=V$_{ref}$, Vb2=V$_{ref}$, Vb3=0 and Vb4=4V$_{ref}$. At time interval T2, Vb1=V$_{ref}$, Vb2=0, Vb3=V$_{ref}$ and Vb4=4V$_{ref}$. At time interval T3, Vb1=V$_{ref}$, Vb2=V$_{ref}$, Vb3=0 and Vb4=-4V$_{ref}$. At time interval T4, Vb1=-V$_{ref}$, Vb2=-V$_{ref}$, Vb3=0 and Vb4=0. At time interval T5, Vb1=0, Vb2=V$_{ref}$, Vb3=V$_{ref}$ and Vb4=-4V$_{ref}$. At time interval T6, Vb1=0, Vb2=-V$_{ref}$, Vb3=-V$_{ref}$ and Vb4=0. At time interval T7, Vb1=-V$_{ref}$, Vb2=0, Vb3=-V$_{ref}$ and Vb4=0. At time interval T8, Vb1=-V$_{ref}$, Vb2=-V$_{ref}$, Vb3=0 and Vb4=0.

When the voltage values are the one of the bridges of the boost converter of FIG. 1c, the switch S4 is in conductive state during time intervals T1 and T2 (P=2) and in non conductive state at time intervals T3 to T8 (N=8).

FIG. 12g comprises voltage values on the bridges of the RLBC in order to have a ratio Vout/Vin=N/(N−P)=1.14 (D=0.125).

Eight time intervals are needed in order to get a ratio Vout/Vin=1.14.

At time interval T1, Vb1=V$_{ref}$, Vb2=V$_{ref}$, Vb3=V$_{ref}$ and Vb4=4V$_{ref}$. At time interval T2, Vb1=V$_{ref}$, Vb2=V$_{ref}$, Vb3=V$_{ref}$ and Vb4=-4V$_{ref}$. At time interval T3, Vb1=V$_{ref}$, Vb2=-V$_{ref}$, Vb3=-V$_{ref}$ and Vb4=0. At time interval T4, Vb1=0, Vb2=0, Vb3=-V$_{ref}$ and Vb4=0. At time interval T5, Vb1=0, Vb2=-V$_{ref}$, Vb3=0 and Vb4=0. At time interval T6, Vb1=-V$_{ref}$, Vb2=V$_{ref}$, Vb3=-V$_{ref}$ and Vb4=0. At time interval T7, Vb1=-V$_{ref}$, Vb2=0, Vb3=0 and Vb4=0. At time interval T8, Vb1=-V$_{ref}$, Vb2=-V$_{ref}$, Vb3=V$_{ref}$ and Vb4=0.

When the voltage values are the one of the bridges of the boost converter of FIG. 1c, the switch S4 is in conductive state during time interval T1 (P=1) and in non conductive state at time intervals T2 to T8 (N=8).

FIGS. 13a to 13f are examples of voltage values on the bridges of the boost converter composed of four bridges in order to have different step-up ratios when the periodical pattern is decomposed into seven time intervals.

In the lines 1301, 1311, 1321, 731, 1341 and 1351 a value which is equal to 1 means that Vb1=V$_{ref}$, a value which is equal to −1 means Vb1=-V$_{ref}$ and a value which is equal to 0 means Vb1=0.

In the lines 1302, 1312, 1322, 1332, 1342 and 1352 a value which is equal to 1 means that Vb2=V$_{ref}$, a value which is equal to −1 means Vb2=-V$_{ref}$ and a value which is equal to 0 means Vb2=0.

In the lines 1303, 1313, 1323, 1333, 1343 and 1353 a value which is equal to 1 means that Vb3=V$_{ref}$, a value which is equal to −1 means Vb3=-V$_{ref}$ and a value which is equal to 0 means Vb3=0.

In the lines 1304, 1314, 1324, 1334, 1344 and 1354 a value which is equal to 1 means that Vb4=4V$_{ref}$, a value which is equal to −1 means Vb4=-4V$_{ref}$ and a value which is equal to 0 means Vb3=0.

The duration of each time interval T1 to T7 is ΔT=T/N (N=7), where T is the duration of the cycle operated by switch S4 of the FIG. 1c or by switch S42' of FIG. 1d.

FIG. 13a comprises voltage values on the bridges of the RLBC in order to have a ratio Vout/Vin=N/(N−P)=7 (D=0.857).

Seven time intervals are needed in order to get a ratio Vout/Vin=7.

At time interval T1, Vb1=V$_{ref}$, Vb2=0 Vb3=0 and Vb4=0. At time interval T2, Vb1=V$_{ref}$, Vb2=V$_{ref}$, Vb3=-V$_{ref}$ and Vb4=0. At time interval T3, Vb1=V$_{ref}$, Vb2=0 Vb3=0 and Vb4=0. At time interval T4, Vb1=0, Vb2=0, Vb3=V$_{ref}$ and Vb4=0. At time interval T5, Vb1=-V$_{ref}$, Vb2=V$_{ref}$, Vb3=V$_{ref}$ and Vb4=0. At time interval T6, Vb1=-V$_{ref}$, Vb2=-V$_{ref}$, Vb3=-V$_{ref}$ and Vb4=4V$_{ref}$. At time interval T7, Vb1=-V$_{ref}$, Vb2=-V$_{ref}$, Vb3=0 and Vb4=-4V$_{ref}$.

When the voltage values are the one of the bridges of the boost converter of FIG. 1c, the switch S4 is in conductive state during time intervals T1 to T6 (P=6) and in non conductive state at time interval T7 (N=7).

FIG. 13b comprises voltage values on the bridges of the RLBC in order to have a ratio Vout/Vin=N/(N−P)=3.5 (D=0.714).

Seven time intervals are needed in order to get a ratio Vout/Vin=3.5.

At time interval T1, Vb1=-V$_{ref}$, Vb2=-V$_{ref}$ Vb3=0 and Vb4=4V$_{ref}$. At time interval T2, Vb1=-V$_{ref}$, Vb2=0, Vb3= -V$_{ref}$ and Vb4=4V$_{ref}$. At time interval T3, Vb1=V$_{ref}$, Vb2=V$_{ref}$, Vb3=0 and Vb4=0. At time interval T4, Vb1=V$_{ref}$, Vb2=V$_{ref}$, Vb3=0 and Vb4=0. At time interval T5, Vb1=V$_{ref}$, Vb2=0, Vb3=V$_{ref}$ and Vb4=0. At time interval T6, Vb1=0, Vb2=-V$_{ref}$, Vb3=0 and Vb4=-4V$_{ref}$. At time interval T7, Vb1=-V$_{ref}$, Vb2=0, Vb3=0 and Vb4=-4V$_{ref}$.

When the voltage values are the one of the bridges of the boost converter of FIG. 1c, the switch S4 is in conductive state during time intervals T1 to T5 (P=5) and in non conductive state at time intervals T6 and T7 (N=7).

FIG. 13c comprises voltage values on the bridges of the RLBC in order to have a ratio Vout/Vin=N/(N−P)=2.33 (D=0.571).

Seven time intervals are needed in order to get a ratio Vout/Vin=2.33.

At time intervals T1 and T2, Vb1=-V$_{ref}$, Vb2=-V$_{ref}$, Vb3=V$_{ref}$ and Vb4=4V$_{ref}$. At time interval T3, Vb1=V$_{ref}$, Vb2=V$_{ref}$, Vb3=V$_{ref}$ and Vb4=0. At time interval T4, Vb1=V$_{ref}$, Vb2=-V$_{ref}$, Vb3=-V$_{ref}$ and Vb4=V$_{ref}$. At time interval T5, Vb1=0, Vb2=0, Vb3=0 and Vb4=−4V$_{ref}$. At time intervals T6 and T7, Vb1=0, Vb2=V$_{ref}$, Vb3=−V$_{ref}$ and Vb4=−4V$_{ref}$.

When the voltage values are the one of the bridges of the boost converter of FIG. 1c, the switch S4 is in conductive state during time intervals T1 to T4 (P=4) and in non conductive state at time intervals T5 to T7 (N=7).

FIG. 13d comprises voltage values on the bridges of the RLBC in order to have a ratio Vout/Vin=N/(N−P)=1.75 (D=0.429).

Seven time intervals are needed in order to get a ratio Vout/Vin=1.75.

At time intervals T1 and T2, Vb1=0, Vb2=−V$_{ref}$ Vb3=V$_{ref}$ and Vb4=4V$_{ref}$. At time interval T3, Vb1=0, Vb2=0, Vb3=0 and Vb4=4V$_{ref}$. At time interval T4, Vb1=−V$_{ref}$, Vb2=V$_{ref}$ Vb3=V$_{ref}$ and Vb4=−4V$_{ref}$. At time interval T5, Vb1=−V$_{ref}$, Vb2=−V$_{ref}$, Vb3=−V$_{ref}$ and Vb4=0. At time intervals T6 and T7, Vb1=V$_{ref}$, Vb2=V$_{ref}$, Vb3=−V$_{ref}$ and Vb4=−4V$_{ref}$.

When the voltage values are the one of the bridges of the boost converter of FIG. 1c, the switch S4 is in conductive state during time intervals T1 to T3 (P=3) and in non conductive state at time intervals T4 to T7 (N=7).

FIG. 13e comprises voltage values on the bridges of the RLBC in order to have a ratio Vout/Vin=N/(N−P)=1.4 (D=0.285).

Seven time intervals are needed in order to get a ratio Vout/Vin=1.4.

At time interval T1, Vb1=V$_{ref}$, Vb2=0 Vb3=0 and Vb4=4V$_{ref}$. At time interval T2, Vb1=0, Vb2=V$_{ref}$, Vb3=0 and Vb4=4V$_{ref}$. At time interval T3, Vb1=−V$_{ref}$, Vb2=0, Vb3=−V$_{ref}$ and Vb4=0. At time intervals T4 and T5, Vb1=−V$_{ref}$, Vb2=−V$_{ref}$, Vb3=0 and Vb4=0. At time interval T6, Vb1=V$_{ref}$, Vb2=0, Vb3=V$_{ref}$ and Vb4=−4V$_{ref}$. At time interval T7, Vb1=V$_{ref}$, Vb2=V$_{ref}$, Vb3=0 and Vb4=−4V$_{ref}$.

When the voltage values are the one of the bridges of the boost converter of FIG. 1c, the switch S4 is in conductive state during time intervals T1 and T2 (P=2) and in non conductive state at time intervals T3 to T7 (N=7).

FIG. 13f comprises voltage values on the bridges of the RLBC in order to have a ratio Vout/Vin=N/(N−P)=1.17 (D=0.143).

Seven time intervals are needed in order to get a ratio Vout/Vin=1.17.

Seven time intervals are needed in order to get a ratio Vout/Vin=1.4.

At time intervals T1, Vb1=V$_{ref}$, Vb2=V$_{ref}$ Vb3=0 and Vb4=4V$_{ref}$. At time interval T2, Vb1=V$_{ref}$, Vb2=V$_{ref}$, Vb3=V$_{ref}$ and Vb4=−4V$_{ref}$. At time interval T3, Vb1=V$_{ref}$, Vb2=−V$_{ref}$, Vb3=−V$_{ref}$ and Vb4=0. At time interval T4, Vb1=0, Vb2=0, Vb3=−V$_{ref}$ and Vb4=0. At time interval T5, Vb1=−V$_{ref}$, Vb2=−V$_{ref}$, Vb3=V$_{ref}$ and Vb4=0. At time intervals T6 and T7, Vb1=−V$_{ref}$, Vb2=Vb3=Vb4=0.

When the voltage values are the one of the bridges of the boost converter of FIG. 1c, the switch S4 is in conductive state during time intervals T1 and T2 (P=1) and in non conductive state at time intervals T3 to T7 (N=7).

FIGS. 14a and 14b are examples of voltage values on the bridges of the boost converter composed of four bridges in order to have different step-up ratios when the periodical pattern is decomposed into six time intervals.

In the lines 1401 and 1411 a value which is equal to 1 means that Vb1=V$_{ref}$, a value which is equal to −1 means Vb1=−V$_{ref}$ and a value which is equal to 0 means Vb1=0.

In the lines 1402 and 1412 a value which is equal to 1 means that Vb2=V$_{ref}$, a value which is equal to −1 means Vb2=−V$_{ref}$ and a value which is equal to 0 means Vb2=0.

In the lines 1403 and 1413 a value which is equal to 1 means that Vb3=V$_{ref}$, a value which is equal to −1 means Vb3=−V$_{ref}$ and a value which is equal to 0 means Vb3=0.

In the lines 1404 and 1414 a value which is equal to 1 means that Vb4=4V$_{ref}$, a value which is equal to −1 means Vb4=−4V$_{ref}$ and a value which is equal to 0 means Vb3=0.

The duration of each time interval T1 to T6 is ΔT=T/N (N=6), where T is the duration of the cycle operated by switch S4 of the FIG. 1c or by switch S42' of FIG. 1d.

FIG. 14a comprises voltage values on the bridges of the RLBC in order to have a ratio Vout/Vin=N/(N−P)=1.2 (D=0.167).

Six time intervals are needed in order to get a ratio Vout/Vin=1.2.

At time interval T1, Vb1=V$_{ref}$, Vb2=V$_{ref}$ Vb3=−V$_{ref}$ and Vb4=4V$_{ref}$. At time interval T2, Vb1=V$_{ref}$, Vb2=V$_{ref}$, Vb3=V$_{ref}$ and Vb4=−4V$_{ref}$. At time interval T3, Vb1=V$_{ref}$, Vb2=−V$_{ref}$ Vb3=−V$_{ref}$ and Vb4=0. At time interval T4, Vb1=−V$_{ref}$, Vb2=−V$_{ref}$, Vb3=V$_{ref}$ and Vb4=0. At time intervals T5 and T6, Vb1=−V$_{ref}$, Vb2=0, Vb3=0 and Vb4=0.

When the voltage values are the one of the bridges of the boost converter of FIG. 1c, the switch S4 is in conductive state during time intervals T1 to T5 (P=5) and in non conductive state at time interval T6 (N=6).

FIG. 14b comprises voltage values on the bridges of the RLBC in order to have a ratio Vout/Vin=N/(N−P)=6 (D=0.833).

Six time intervals are needed in order to get a ratio Vout/Vin=1.2.

At time interval T1, Vb1=−V$_{ref}$, Vb2=−V$_{ref}$ Vb3=−V$_{ref}$ and Vb4=4V$_{ref}$. At time interval T2, Vb1=−V$_{ref}$, Vb2=V$_{ref}$, Vb3=V$_{ref}$ and Vb4=0. At time interval T3, Vb1=V$_{ref}$, Vb2=V$_{ref}$ Vb3=−V$_{ref}$ and Vb4=0. At time intervals T4 and T5, Vb1=V$_{ref}$, Vb2=0, Vb3=0 and Vb4=0. At time interval T6, Vb1=−V$_{ref}$, Vb2=−V$_{ref}$, Vb3=V$_{ref}$ and Vb4=−4V$_{ref}$.

When the voltage values are the one of the bridges of the boost converter of FIG. 1c, the switch S4 is in conductive state during time interval T1 (P=5) and in non conductive state at time interval T2 to T6 (N=6).

Figure 15:
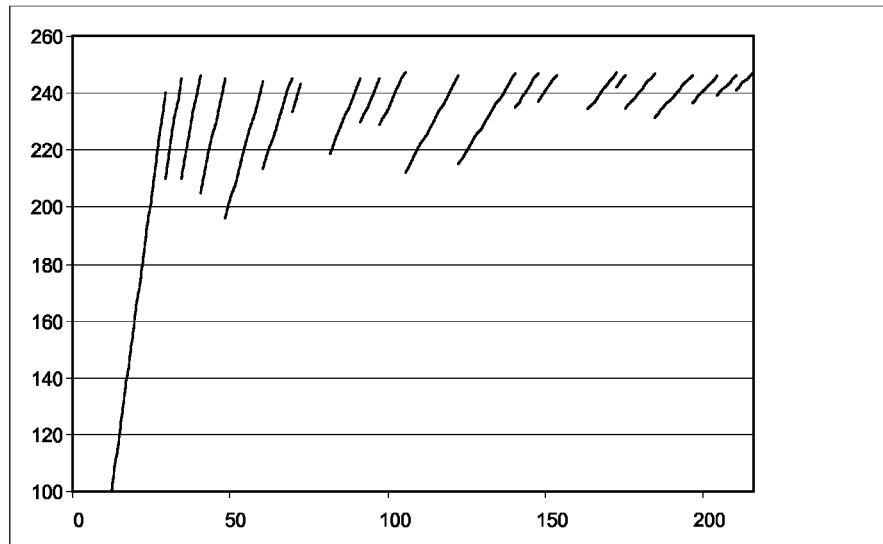
FIG. 15 is an example of transfer function curves which are obtained according to the present invention for boost converters composed of plural bridge devices.

FIG. 15 is an example of transfer function curves which are obtained according to the present invention for boost converters composed of n bridge devices. The x axis represents the input voltage (Vin) of RLBC and the y axis represents the output voltage of RLBC (Vout).

In FIG. 15, twenty curves are shown. The first curve starting from the left side is the curved obtained when the switching pattern of switches of the bridges of the RLBC are equal to the one mentioned in the FIG. 5a. The upper point of the first curve exhibits input, output and bit voltage corresponding to the line 310 of the FIG. 3a.

The next curve starting from the left side is the curved obtained when the switching pattern of switches of the bridges of the RLBC are equal to the one mentioned in the FIG. 6a. The upper point of the second curve exhibits input, output and bit voltage corresponding to the next line 311 of the FIG. 3a.

The following curves correspond respectively to the curved obtained when the switching pattern of switches of the bridges of the RLBC are equal to the one mentioned in the Figs indicated in the lines 312 to 330 of the FIG. 3a. The upper point of the first curve exhibits input, output and bit voltage corresponding to the lines 312 to 330 of the FIG. 3a FIG. 16 is an example of an algorithm for determining which switch commands have to be used for the boost converter composed of n bridge devices according to the present invention.

The present algorithm is executed by the device 20 comprising a boost converter composed of n bridge devices.

The present algorithm may be executed by the processor 200.

At step S1600, the processor 200 gets the input voltage Vin that the boost converter composed of n bridge devices has to boost. For example, Vin could be the result of a measurement made by digital converter 206 of the input voltage applied to the boost converter composed of n bridge devices. As other example, Vin could be determined by computation by processor 200 from yet other measurement made by digital converter 206 of other signals, such as bit voltages, output voltage, input or output currents, so as to realise a specific regulation function. In a special embodiment of the invention, the regulation function is determined so as to maximise the electrical power passing through the boost converter composed of n bridge devices.

At next step S1601, the processor 200 gets the desired range of output voltage in which the input voltage has to be boosted by the boost converter composed of n bridge devices. This range is composed of a maximum voltage value Vmax and a minimum voltage value Vmin. For example, the desired range of output voltage is known in advance as the acceptable input range of the load equipment that is connected to the output of the boost converter composed of n bridge devices.

At next step S1602, the processor 200 gets the desired output voltage Vout to which the input voltage Vin has ideally to be boosted by the boost converter composed of n bridge devices within the desired range. For example, the desired output voltage Vout is equal to Vmax. In another example, Vout is equal (Vmax+Vmin)/2.

At next step S1603, the processor 200 checks for each duty cycle D stored in the ROM memory 202 the boosted voltage value Vboost=Vin/(1−D) and selects among the duty cycles stored in the ROM memory 202, the duty cycle for which the boosted voltage value Vboost is closest to the desired output voltage Vout within the desired range of output voltage.

At next step S1604, the processor 200 commands the switches of the RLBC 205 according to the pattern stored in memory 202 which corresponds to the duty cycle selected at step S1603.

In a variant, the processor 200 commands the switches of the RLBC 205 according to a pattern that results from a permutation of columns of the pattern shown in the corresponding Fig among the FIGS. 5 to 9 or 10 to 14 and stored in memory 202, which corresponds to the duty cycle selected at step S1603.

After that, the processor 200 returns to step S1600.

For example, at step S1600, the processor 200 gets an input voltage Vin=145 V.

At next step S1601, the processor 200 gets an output voltage Vmax=247 V and Vmin=197 V.

At next step S1602, the processor 200 gets a desired output voltage Vout=227V.

At next step S1603, the processor selects D=0.375 and pattern indicated in FIG. 5f, as the output voltage Vboost=145/(1−0.375)=232 V is closest to the desired output voltage Vout, among those in desired output range.

As other example, if at step S1602 the desired output voltage is Vout=247 V, at step S803, the processor selects D=0.4 and pattern indicated in FIG. 9c, as the output voltage Vboost=145/(1−0.4)=242 V is closest to the desired output voltage Vout, among those in the desired output range.

Naturally, many modifications can be made to the embodiments of the invention described above without departing from the scope of the present invention.

The invention claimed is:

1. Method for controlling the output voltage of a boost converter comprising a number n of bridge devices connected in series, n being a positive integer, each bridge device including plural switches and a capacitor, wherein the method comprises:

selecting a periodical matrix pattern with a plurality of N time intervals, N being a positive integer greater than 2, with a voltage between the input and the output of each $i^{th}$ bridge device, i being a positive integer from 1 to n, being indicated in each time interval as being equal to one of a null value, a predetermined number $k_i$ times a positive value, and minus the predetermined number $k_i$ times the positive value, with the positive value being the result of the division of an output voltage of the boost converter composed of the n bridge devices by the number of time intervals N of the periodical pattern; and controlling the switches according to the selected periodical matrix pattern.

2. Method according to claim 1, wherein the selected periodical matrix pattern includes a matrix $V_{ij}$ of voltages between the input and the output of the $i^{th}$ bridge device during a $j^{th}$ time interval of the N intervals of the selected periodical matrix pattern is of rank rk, rk being the number of bridge devices having at least one non null voltage value during the selected periodical matrix pattern.

3. Method according to claim 2, wherein the selected periodical matrix pattern is given by a permutation in times intervals of the periodical matrix pattern.

4. Method according to claim 1, wherein the sum of the voltages between an input and an output of a bridge device over the number of time intervals of the selected periodical matrix pattern equals a null value.

5. Method according to claim 1, wherein a first bridge device is connected to one of the terminals of an electric power source boosted by the boost converter including n bridge devices and one of the switches of another bridge device is connected to the other terminal of the electric power source boosted by the boost converter including n bridge devices or the first bridge device is connected to one of the terminals of an electric power source boosted by the boost converter including n bridge devices and the boost converter including n bridge devices further comprises at least a switch which is connected to the other bridge device and to the other terminal of the electric power source boosted by the boost converter including n bridge devices.

6. Method according to claim 5, wherein for any time interval in a first subset of time intervals of the selected periodical matrix pattern, the switch which is connected to the other terminal of the electric power source boosted by the boost converter including n bridge devices is conducting during the time intervals of the first subset and the sum of the voltages between an input and an output of the bridge devices during the time intervals of the first subset equals an integer number Kp times a first positive value.

7. Method according to claim 6, wherein the first subset of time intervals comprises Kp time intervals, the second subset comprises P time intervals, where P is a positive integer, and the number Kp equals the number of time intervals N of the periodical pattern minus number P.

8. Method according to claim 5, wherein for any time interval in a second subset of time intervals of the selected periodical matrix pattern, the switch which is connected to the other terminal of the electric power source boosted by the boost converter including n bridge devices is not conducting during the time intervals of the second subset and the sum of the voltages between an input and an output of the bridge devices during the time intervals of the second subset equals minus a non null integer number P times a first positive value.

9. Method according to claim 1, wherein each number $k_i$ with i from 1 to n equals 2 to the power of i minus 1.

10. Method according to the claim 9, wherein n is equal to 3, $k_1$ equals 1, $k_2$ equals 2, and $k_3$ equals 4.

11. Method according to claim 1, wherein n is equal to 4, $k_1$ equals $_1$, $k_2$ equals 1, k3 equals 1, and $k_4$ equals 4.

12. Method according to claim 1, wherein the number of time intervals N is between 5 and 10.

13. Method according to claim 12, wherein the method further comprises selecting the periodical matrix pattern from among a plurality of stored periodical matrix patterns according to an expected value of the output voltage of the boost converter composed of n bridge devices.

14. Apparatus for controlling the output voltage of a boost converter including a number n of bridge devices connected in series, each bridge device including plural switches and a capacitor, wherein the apparatus comprises:

means for selecting a periodical matrix pattern with a plurality of N time intervals, N being a positive integer greater than 2, with a voltage between the input and the output of each $i^{th}$ bridge device, i being a positive integer from 1 to n, being indicated in each time interval as being equal to one of a null value, a predetermined number $k_i$, times a positive value, and minus the predetermined number $k_i$, times the positive value, with the positive value being the result of the division of an output voltage of the boost converter composed of the n bridge devices by the number of time intervals N of the periodical pattern; and means for controlling the switches according to the selected periodical matrix pattern.

\* \* \* \* \*